(12) United States Patent
Miyazaki et al.

(10) Patent No.: US 6,971,801 B2
(45) Date of Patent: Dec. 6, 2005

(54) BEARING UNIT

(75) Inventors: Seizou Miyazaki, Kanagawa (JP); Touru Takamizawa, Kanagawa (JP)

(73) Assignee: NSK. Ltd., Tokyo (JP)

( * ) Notice: Subject to any disclaimer, the term of this patent is extended or adjusted under 35 U.S.C. 154(b) by 336 days.

(21) Appl. No.: 09/955,171

(22) Filed: Sep. 19, 2001

(65) Prior Publication Data

US 2003/0048965 A1  Mar. 13, 2003

(30) Foreign Application Priority Data

| Sep. 19, 2000 | (JP) | P. 2000-283732 |
| Sep. 19, 2000 | (JP) | P. 2000-283733 |
| Apr. 25, 2001 | (JP) | P. 2001-128134 |
| Jun. 11, 2001 | (JP) | P. 2001-175720 |

(51) Int. Cl.[7] ............................................. F16C 33/60
(52) U.S. Cl. ........................ 384/504; 384/518; 384/537
(58) Field of Search ............................... 384/504, 517, 384/518, 537, 513

(56) References Cited

U.S. PATENT DOCUMENTS

| 4,699,528 A | * | 10/1987 | Gotman ...................... 384/536 |
| 4,721,441 A | * | 1/1988 | Miyashita et al. ............ 417/407 |
| 5,047,677 A | * | 9/1991 | Mineta et al. ............. 310/67 R |
| 5,147,144 A | * | 9/1992 | Kasai .......................... 403/259 |
| 5,354,391 A | * | 10/1994 | Goodell et al. .............. 152/417 |
| 5,552,650 A | * | 9/1996 | Cap et al. ................... 310/67 R |
| 5,584,778 A | * | 12/1996 | Machida et al. ............... 476/46 |
| 5,686,771 A | * | 11/1997 | Ishizuka et al. ............... 310/90 |
| 5,863,136 A | * | 1/1999 | Miyazaki ..................... 384/512 |
| 5,899,574 A | * | 5/1999 | Chujo ......................... 384/518 |
| 6,042,273 A | * | 3/2000 | Thrasher ...................... 384/517 |

FOREIGN PATENT DOCUMENTS

| JP | 405071548 A | * | 3/1993 |
| JP | 7-167151 | | 7/1995 |
| JP | 9-88966 | | 3/1997 |

* cited by examiner

*Primary Examiner*—Thomas R. Hannon
(74) *Attorney, Agent, or Firm*—Sughrue Mion, PLLC

(57) ABSTRACT

A bearing unit includes: a housing; a shaft passing through the housing and rotatably supported on the housing; and a pair of rolling bearings disposed between the housing and the shaft and fitted to two positions on the shaft, which are axially spaced apart from each other. At least one rolling bearing has an inner ring press-fitted to the shaft. The inner ring defines an intermediate portion including an inner raceway surface. A reduced diameter part having an outer diameter smaller than the inner diameter of the inner ring and a predetermined width in the axial direction is formed on the shaft at a position corresponding to the intermediate portion so that inner circumferential surfaces located at both ends of the inner ring in the axial direction are interference fitted to the shaft and the inner circumferential surface at the intermediate portion thereof is clearance fitted to the shaft.

14 Claims, 20 Drawing Sheets

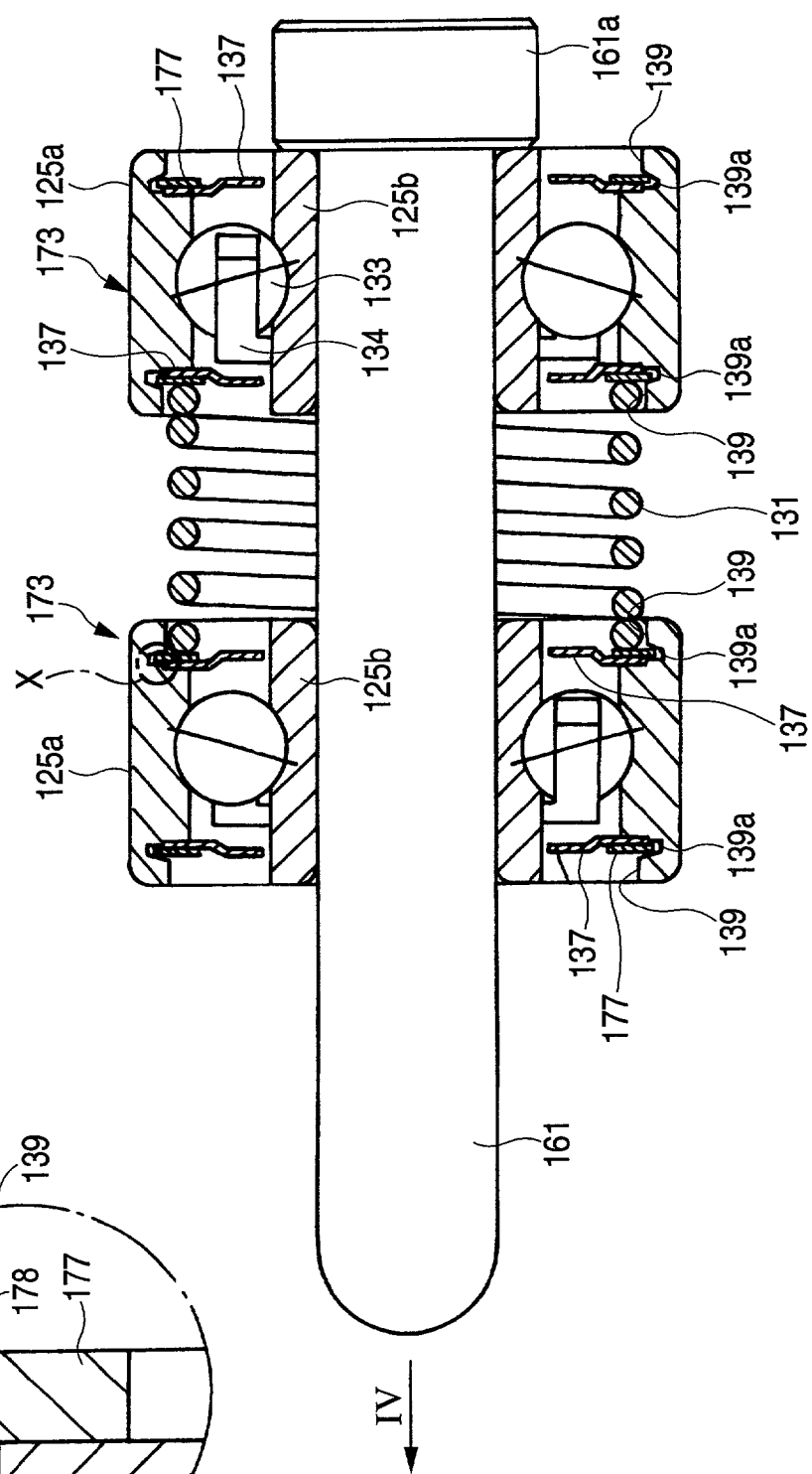
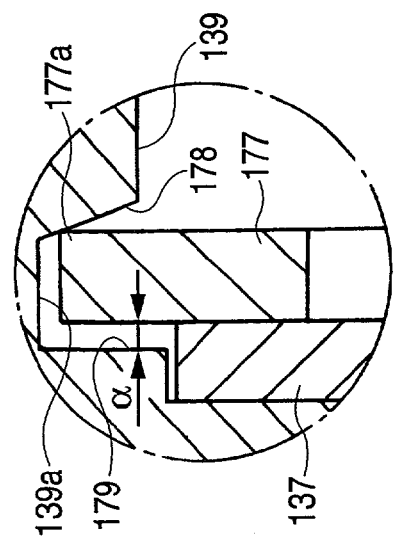
FIG. 10A
FIG. 10B

BEARING UNIT

BACKGROUND OF THE INVENTION

1. Field of the Invention

The present invention relates to a bearing unit utilized for the support of a rotary shaft of a rotation drive section or a motor such as a VRT (video tape recorder) drum spindle motor and a LBP (laser beam printer) spindle motor.

2. Description of the Related Art

The silence performance as well as the running performance with a high precision must be required for the support of the rotary shaft in a rotation drive section of an information processing device handling a magnetic recording disc, a magneto-optical recording disc, or the like, a rotation drive section used in an audiovisual device handling audio and video magnetic recording tapes, and a motor used in the rotation drive section.

To improve the silence performance as well as the running performance with a high precision, there is proposed a bearing unit constructed such that a shaft as a rotary shaft is rotatably supported on a shaft-support housing through which the shaft passes, via a pair of rolling bearings which are fitted into two positions on the shaft, which are spaced apart from each other in the axial direction, and a preload of an axial direction is applied to the outer rings of the rolling bearings in order to eliminate a play between the inner and outer rings and the rolling elements.

In such a bearing unit, as a method for fastening the inner ring of the rolling bearing to the shaft, there has been widely used a method in which the interference fitting dimension is employed for the fitting of the inner ring to the shaft, and the inner ring is press-fitted to the shaft.

In case of the inner ring fastening method based on the press-fitting, an internal stress is generated in the inner ring at the time of press-fitting or after the press-fitting, so that an inner raceway surface is easy to be distorted. The distortion of the inner raceway surface results in increase of the vibration at the time of rotation. As a result, there is a possibility that the silence performance of the bearing unit at the time of rotation is impaired, and the NRRO increases.

There is proposed a bearing unit shown in FIG. 21 as the bearing unit for preventing the distortion of the inner raceway surface caused by the press-fitting of the inner ring.

In this bearing unit, which is disclosed in JP-A-7-167151, a shaft 3 to be driven to rotate is rotatably supported on a shaft-support housing 9 through which the shaft 3 passes, via a double-row rolling bearings 5.

The rolling bearing 5 includes a pair of inner rings 5a and 5b disposed away from each other in the axial direction of the shaft 3, a single outer ring 5c surrounding the inner rings 5a and 5b, a plurality of balls 5d which form a first row of rolling elements and are disposed between the inner ring 5a and the outer ring 5c, a plurality of balls 5e which forms a second row of rolling elements and are disposed between the inner ring 5b and the outer ring 5c, retainers 5f and 5g for defining intervals between the adjacent balls of the rolling element rows, and sealing plates 5h attached to both ends of the outer ring 5c.

The sealing plates 5h function to prevent lubricant oil, e.g., grease, filled between the inner and outer rings from leaking therefrom, and to prevent dust from entering the bearing.

The inner rings 5a and 5b are fastened to the shaft 3 due to press-fitting, and raceway surfaces 6 for rolling the balls 5d and 5e are located close to the outer ends of the inner rings. An inside diameter part 7, which is located closer to the outer end corresponding to an existing region of the raceway surface 6, is set to be larger in diameter than the outside diameter of the shaft 3 so that it is clearance-fitted to the shaft 3. Only an inside diameter part 8, which is located closer to the inner end away from the existing region of the raceway surface 6, is selected to be smaller than the outside diameter of the shaft 3 so that it is interference-fitted to the shaft 3. A groove 9 for interrupting the transmission of stress is circumferentially formed between the inside diameter parts 7 and 8.

Thus, the rolling bearings 5 is designed such that the inner circumferential surface to be interference-fitted to the shaft 3 is limited to within the inside diameter part 8 that is locate close to the inner end away from the existing position of the raceway surface 6, thereby preventing the distortion of the inner raceway surface resulting from the press-fitting of the inner ring.

The conventional bearing unit thus constructed is capable of preventing the distortion of the inner raceway surface resulting from the press-fitting of the inner ring. A portion of each of the inner rings 5a and 5b that is effective for suppressing the run-out of the shaft 3 in its axial direction is only the width $W_0$ of the inside diameter part 8, which is a part of the full width W of the inner ring as viewed in the axial direction. As a result, the suppression of flexural deformation of the shaft at the time of its rotation will be sufficient, or when the bearing is assembled to the shaft 3, a minute inclination of it will inevitably occur. Accordingly, it is insufficient to suppress the vibration and the run-out of the shaft when it is rotated. This leads to impair the silence performance. Further, there is a possibility that the positioning accuracy of the shaft 3 is reduced and hence, the running performance of the shaft is degraded.

Further, FIG. 22 shows a conventional bearing unit used for a rotation drive section or motor, which requires a silent performance.

In this bearing unit, a shaft 103 to be driven to rotate is rotatably supported on a shaft-support housing 109 into which the shaft 103 passes, through a pair of rolling bearings 105 and 107 which are fitted to two positions on the shaft 103, which are spaced from each other in the axial direction. A compression coil spring 111 is placed between the outer rings 105a and 107a of the rolling bearings 105 and 107 while being wound around the shaft 103, whereby a preload in such directions as to move apart from each other is applied to those outer rings 105a and 107a.

In this case, as shown, the pair of rolling bearings 105 and 107 are ball bearings constructed such that balls 113 and 114 as rolling elements are placed in the inner rings 105b and 107b fitted to the outer circumferential surface of the shaft 103 and the inner rings 105a and 107a fitted to the inner circumferential surface of a shaft-support housing 109.

Stepped parts 105c and 107c for spring seats are formed on the opposed inner end faces of the outer rings 105a and 107a in a spot-facing fashion. The ends of the compression coil spring 111 are brought into contact with the inner end faces of the inner rings 105a and 107a through exclusive spring seats 115 and 116, to thereby position the compression coil spring 111 thereto.

The spring seats 115 and 116 are integrally formed with collars 115a and 116a and cylindrical parts 115b and 116b. The collars 115a and 116b are fitted into the stepped parts 105c and 107c to stop the movement thereof in a radial direction of the shaft 103. The cylindrical parts 115b and 116b are axially protruded from the collars 115a and 116a, and are fitted into the ends of the compression coil spring 111 to stop relative movements of the compression coil spring 111 and the spring seats 115 and 116 in the radial direction.

In addition, reference numeral 117 designates a shield fixed to each of end surfaces 105d and 107d positioned opposite to the stepped parts 105c and 107c. Reference numeral 118 designates a retainer, and a back side 119 of the retainer 118 is positioned at a side of the shield 117.

In the above bearing unit, the rattling of the inner and outer rings 105a and 107a and the balls 113 in the rolling bearings 105 and 107 in the axial direction is prevented by the preload of the compression coil spring 111 applied to the outer rings 105a an 107a, to thereby realize the reduction of noise generated when the shaft rotates (viz., silencing)

However, since the conventional device uses the exclusive spring seats 115 and 116, upon assembling the device, the pair of rolling bearings 105 and 107, the compression coil spring 111 and the exclusive spring seats 115 and 116 have to be assembled on the shaft 103 in accordance with the order of their arrangement. Therefore, the number of required component parts and the number of assembling steps are increased, leading to the increase of the cost to manufacture the rotation drive section and the lowering of the productivity.

The used rolling bearings 105 and 107 do not include sealing members for preventing a lubricant which fills a space between the inner and outer rings from leaking therefrom. For this reason, it is difficult to maintain good lubricating performance for a long time by lubricant oil shortage due to the leakage of lubricant, and the entering of dust. Degradation of the lubricating performance leads to degradation of the silencing performance and the reduction of the lifetime.

Moreover, in this type of the bearing unit, it is preferable to elongate the center-to-center distance (called also a span) between the bearings in the light of the increase of the moment rigidity.

In the bearing structure having such an advantage, it is desirable that the width of the bearing is narrow for elongating the span between the bearings largely.

However, the conventional bearing unit as shown in FIG. 21 uses the bearing having a wide width. In such a bearing unit, to avoid the interference of the shields 117 with the back side 119 of the retainer 118, it is difficult to reduce the width of the bearing. Therefore, it is impossible to apply the bearing having a narrow width, and thus, it is difficult to obtain the advantage of increasing the moment rigidity.

As another approach, there is obtained a bearing structure that the spring seats 115 and 116 are removed so that the inside of the bearing is opened. However, the mere opening of the inside causes the spring to enter the inside of the bearing or jump out from the bearing while slipping the flat surface of the outer ring.

In addition, in the high precision small motor used for the small VTR or the LBP, there is conventionally used a bearing unit (bearing with the shaft) such that two raceway grooves are formed in the outer circumferential surface of a rotary shaft while being spaced apart from each other in the axial direction, outer rings are mounted on the shaft through rolling elements and a coil spring is inserted between the outer rings for preload.

In a bearing unit disclosed in JP-A-9-8896, two rolling bearings are interference fitted to the outer circumferential surface of a shaft, while being spaced apart from each other in the axial direction. And, a coil spring is placed between the outer rings of the rolling bearings for preload.

In assembling the bearing with the shaft, the spring is inserted between the outer rings while the rolling elements and the outer rings are assembled onto the shaft. This assembling work is troublesome and needs much assembling time.

In the bearing unit in which the bearings are interference fitted to the outer circumferential surface of the shaft, the interference on the shaft tends to be bent.

JP-A-9-88966 discloses that the fitting surfaces are minutely displaced relatively, to thereby reduce a residual stress on the fitting surface. Although the technique succeeds in eliminating the occurrence of a vibration, called a run-out, the recent market needs a further reduction of the run-out.

SUMMARY OF THE INVENTION

Accordingly, to solve the above problems, a first object of the invention is to provide a bearing unit which is capable of preventing the distortion of the inner raceway surface caused by the press-fitting of the inner ring, and capable of preventing the occurrence of the inclination between the inner ring and the shaft by a unique feature that the full width of the inner ring effectively regulates the run out of the shaft in the axial direction, and hence, capable of preventing the bearing performance degradation caused by the distortion of the inner raceway surface and also of preventing the bearing performance degradation caused by the inclination of the inner ring to the shaft, and consequently, of further improving the silence performance and the positioning accuracy.

Further, a second object of the present invention is to provide a bearing unit which reduces the cost to manufacture the rotation drive section and improves the productivity by reducing the number of required component parts and the number of assembling steps, and maintains good lubricating performance for a long time, and prevents degradation of the device silencing performance and the reduction of the device lifetime, which result from degradation of the lubricating performance.

Moreover, a third object of the present invention is to provide a bearing unit which has spring seats serving also as the sealing plates, which avoid their interference with the back side of the retainer, and is improved in moment rigidity.

In addition, a fourth object of the present invention is to provide a rolling bearing unit which is free from the troublesome assembling work and the shaft bending at the interference on the shaft, and is small in the run-out.

To attain the first object, according to a first aspect of the invention, there is provided a bearing unit including: a housing; a shaft passing through the housing and rotatably supported on the housing, the shaft defining an axial direction thereof; and a pair of rolling bearings disposed between the housing and the shaft and fitted to two positions on the shaft, which are spaced apart from each other in the axial direction, at least one of the rolling bearings having an inner ring press-fitted to the shaft, wherein a reduced diameter part having an outer diameter smaller than the inner diameter of the inner ring and a predetermined width in the axial direction is formed on the shaft at a position corresponding to an intermediate portion of the inner ring in the axial direction at least partially including an inner raceway surface so that inner circumferential surfaces located at both ends of the inner ring in the axial direction are interference fitted to the shaft and the inner circumferential surface at the intermediate portion thereof is clearance fitted to the shaft.

The reduced diameter part is formed on the shaft to which the inner ring of the rolling bearing is press fitted, at a portion corresponding in position to the inner raceway surface. The inner ring is clearance fitted to the shaft at the reduced diameter part. Accordingly, no stress is generated in the inner ring when it is fitted to the shaft, at this portion, thereby preventing the distortion of the inner raceway surface caused by the press-fitting of the inner ring.

Accordingly, the bearing unit is free from the problems arising from the distortion of the inner raceway surface, such as the increase of the shaft vibration at the time of rotation in the rotation drive sections or motors which use the bearing unit, the silence performance during the rotation is improved and NRRO (non-repetitive run-out) is reduced.

The reduced diameter part which enables the inner ring to be clearance fitted to the shaft is located only at the portion corresponding in position to the inner raceway surface. Both end parts of the inner circumferential surface of the inner ring are interference fitted to the shaft. Therefore, the full width of the inner ring effectively operates for suppressing the run-out of the shaft in the axial direction. Additionally, the full width of the inner ring effectively operates for preventing the inner ring from inclining to the shaft. Accordingly, the bearing unit satisfactorily suppresses the vibration and run-out of the shaft at the time of shaft rotation. There is no possibility that the silence performance is impaired by the vibration and the run-out of the shaft, and that the positioning accuracy of the shaft is degraded by the vibration and the run-out of the shaft. Good running performance of the shaft is stably maintained for long time.

Preferably, the center position of the reduced diameter part is set at the center of the inner raceway surface to be press-fitted or set at a point at which the raceway surface of the inner ring to be press-fitted intersects a contact angle line connecting points at which the rolling element contacts with the inner and outer rings.

This makes clear a positional relationship between the raceway surface and the reduced diameter part. Accordingly, the reduced diameter part which is effective in preventing the raceway surface from being distorted, may easily be formed on the shaft.

In addition, to attain the second object, according to a second aspect of the invention, there is provided a bearing unit including: a housing; a shaft passing through the housing and rotatably supported on the housing, the shaft defining an axial direction thereof; a pair of rolling bearings disposed between the housing and the shaft and fitted to two positions on the shaft, which are spaced apart from each other in the axial direction; a compression spring disposed between the outer rings of the pair of rolling bearings while being wound around the shaft, for applying a preload to the outer rings in such a direction as to move away from each other; sealing plates located at both ends of the respective outer rings of the pair of rolling bearings, for preventing a lubricant filled between the outer ring and the inner ring from leaking therefrom; and spring seats for positioning ends of the compression spring, the spring seats including stepped parts axially formed on the sealing plates, which are located at the inner ends of the outer rings opposed to each other or stepped parts axially formed in the inner ends of the outer rings opposed to each other for retaining the sealing plates.

With such a construction, each of the rolling bearings is provided with sealing plates for preventing lubricant oil, which fills a space between the inner and outer rings at both the ends of the outer ring, from leaking therefrom. Therefore, it is possible to prevent a lubricant shortage as the result of lubricant oil leaking and to prevent dust from entering the bearing. Accordingly, it is possible to maintain good lubricating performance for a long time.

Further, of the sealing plates provided at both ends of each rolling bearing, the sealing plates which are located at the inner ends opposed when those are assembled to the shaft, serves also as the spring seats supporting the ends of the compression coil spring, which applies a preload to the outer rings of the rolling bearings. There is no need of using an exclusive spring seat, which is manufactured separately from the rolling bearing. Further, the assembling step of the exclusive spring seat is not needed in the assembling stage. The number of required component parts and the number of assembling steps are reduced. Accordingly, the reduction of the number of required component parts and the number of assembling steps brings about the following advantages. The reduction of the cost to manufacture the rotation drive section and the improvement of the productivity are achieved. It is possible to maintain good lubricating performance for a long time, and to prevent degradation of the device silencing performance and the reduction of the device lifetime, which result from degradation of the lubricating performance.

Moreover, to achieve the third object, according to a third aspect of the invention, there is provided a bearing unit including: a shaft defining an axial direction thereof; a pair of rolling bearings fitted to two positions on the shaft, which are spaced apart from each other in the axial direction, the rolling bearing including a retainer for guiding rolling elements; a compression spring disposed between the outer rings of the pair of rolling bearings while being wound around the shaft, for applying a preload to the outer rings in such a direction as to move away from each other; and spring seats attached to the pair of rolling bearings, for positioning ends of the compression spring, the spring seats serving as sealing plates for preventing a lubricant filled between the outer ring and the inner ring from leaking therefrom, wherein an inner side of the spring seat defines a retainer-interference avoiding clearance for avoiding an interference with the back side of the retainer.

In the above bearing unit, the spring seat may extend inwardly in the radial direction so that at least one labyrinth is provided between the inner surface of the spring seat and at least one of an end surface of the inner ring and the shaft. Further, the spring seat may be made of a plastic material. And, the spring maybe a coned disk spring. The bearings may be fastened to the shaft by press-fitting and adhesion.

Additionally, to achieve the fourth object, according to a fourth aspect of the invention, there is provide a rolling bearing unit including: a holding member having a first cylindrical peripheral surface, the holding member defining an axial direction and a radial direction; and a plurality of ring members each having second and third cylindrical peripheral surfaces, which are coaxially aligned with each other, the third cylindrical peripheral surfaces having a raceway surface, the plurality of ring members being fitted to the holding member with a predetermined interval in the axial direction such that the second periphery surface of the ring member is interference fitted to the first periphery surface of the holding member, wherein the interference between the first and second periphery surfaces is set to be 4 μm or smaller, a run-out of the holding member in the radial direction when the holding member is rotated is set to be 2 μm or less, and the ring members are fastened to the holding member by the combination of the interference fitting and adhesion.

Further, according to a fifth aspect of the invention, there is provided a rolling bearing unit including: a shaft having a cylindrical outer peripheral surface, the shaft defining an axial direction and a radial direction; and a plurality of rolling bearings held on the shaft with a predetermined interval in the axial direction such that inner rings of the rolling bearings are interference fitted to the outer peripheral surface of the shaft, and the rolling bearings being subjected to a preload, wherein the interference between the shaft and the inner ring is set to be 4 μm or smaller, a run-out of the shaft in the radial direction when the shaft is rotated is selected to be 2 μm or less, and the inner rings are fastened to the shaft by the combination of the interference fitting and adhesion.

In the mechanical arrangements according to the fourth and fifth embodiments, the interference is reduced, and the bending of the holding member or the shaft are reduced by using the interference and the bonding. Accordingly, the run-out in the radial direction is reduced. Since the adhesive is used, the interference may be set to at 0 to 4 μm. Since the interference is small, the work of fitting the ring member or the inner rings to the holding member or the shaft is also easy performed. The bonding may be realized in various ways. It is realized by using adhesive, a bonding member, e.g., adhesive tape, welding, and others.

In the rolling bearing unit according to the fifth aspect of the invention, a recessed portion may be formed in the outer peripheral surface of the shaft at a position facing the inner peripheral surface of the inner ring, and an adhesive may be applied to the recessed portion.

This feature enables one to apply a sufficient amount of adhesive to the fitting parts. Accordingly, time is gained till the adhesive is dried. In this respect, the assembling is facilitated.

Further, at least one of the ends of the recessed portion may extend outside from the end of the inner ring in the axial direction and is exposed to outside.

In this feature, after the inner rings are fit to the shaft, adhesive is injected into the part of each recessed part, which is protruded from the end of the corresponding inner ring, thereby applying the adhesive to between the shaft and the inner ring. In this respect, the assembling is facilitated.

In addition, the recessed portion may be formed around the entire circumference of the shaft, and the outer peripheral surface of the shaft at which the recessed portion may be formed in a cylindrical surface.

In this feature, the bonding area between the shaft and the inner rings is broad, so that those components are fastened firmly.

Moreover, according to a sixth aspect of the invention, there is provided a method of assembling a rolling bearing unit having: a shaft having a cylindrical outer peripheral surface, the shaft defining an axial direction and a radial direction; and a plurality of rolling bearings held on the shaft with a predetermined interval in the axial direction such that inner rings of the rolling bearings are interference fitted to the outer peripheral surface of the shaft, and the rolling bearings being subjected to a preload, the method comprising the steps of: interference-fitting the inner rings onto the outer peripheral surface of the shaft with the interference of 4 μm or smaller; measuring a run-out of the shaft in the radial direction while rotating the shaft; when the run-out is in excess of 2 μm, minutely displacing a fitting surface between the shaft and the inner ring by applying a force to a fitting portion therebetween so that the run-out is reduced to be 2 μm or smaller, to thereby reduce a residual stress in the fitting portion; and bonding the inner rings to the shaft of 2 μm or smaller in run-out.

According to the sixth aspect of the invention, the radial run-out of the shaft is reduced by using the interference and adhesive in combination. The run-out of the haft is measured. If it is relatively large as the result of measurement, the shaft is processed for reducing its run-out. Thereafter, the inner ring is fastened to the shaft completely. The run-out of the shaft may be measured at the part of the shaft (closer to its end as viewed in the axial direction) outside the location of each raceway member or each rolling bearing. When the run-out of the shaft exceeds 2 μm, what one has to do is to carry out the process to remove the residual stress at the fitting parts as disclosed in JP-A-9-88966. When the adhesive is used for bonding the inner rings to the shaft, the run-out reducing process may be carried out before the adhesive is applied to between the shaft and the inner rings.

Adhesive may be any of anaerobic adhesive, epoxy adhesive (room temperature setting adhesive and hot setting adhesive), alpha-cyanoacrylate adhesive, rubber-based adhesive and others. When the process to reduce the radial run-out is carried out after the adhesive is applied to between the shaft and the inner rings, an adhesive of the slow hardening type (anaerobic adhesive) may be used which is selected allowing for the time taken for correcting the run-out.

The fitting faces of the holding member and the raceway members and those of the shaft and the inner rings are preferably coarsened by degreasing in order to improve the bonding strength.

Examples of the method to applying a preload to between the rolling bearings are a method using an urging means, such as a filler piece or coil spring, and a resonance press-fitting method (the press-fitted raceway ring is minutely vibrated at a resonance frequency based on a target bearing rigidity).

BRIEF DESCRIPTION OF THE DRAWINGS

FIG. 10A is a longitudinal sectional view showing a bearing unit which is a ninth embodiment of the invention;

FIG. 10B is an enlarged view of a circle X of FIG. 10A, showing an end portion of the outer ring according to the ninth embodiment;

FIGS. 23A and 23B schematic show a coned disk spring, wherein FIG. 23A is a plan view and FIG. 23B is a cross-sectional view.

DETAILED DESCRIPTION OF THE PREFERRED EMBODIMENTS

Figure 1:
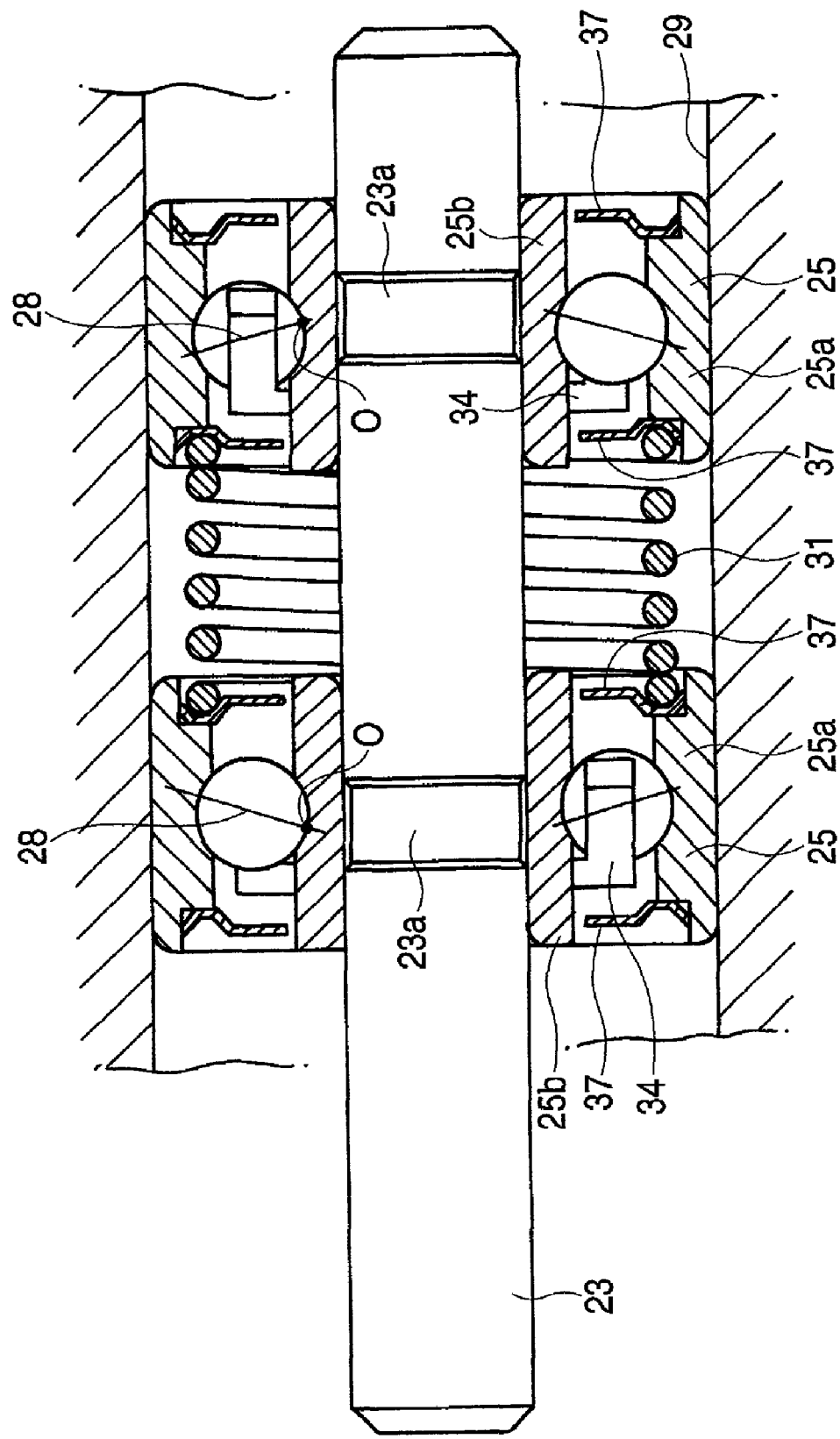
FIG. 1 is a longitudinal sectional view showing a bearing unit which is a first embodiment of the invention.
Figure 2:
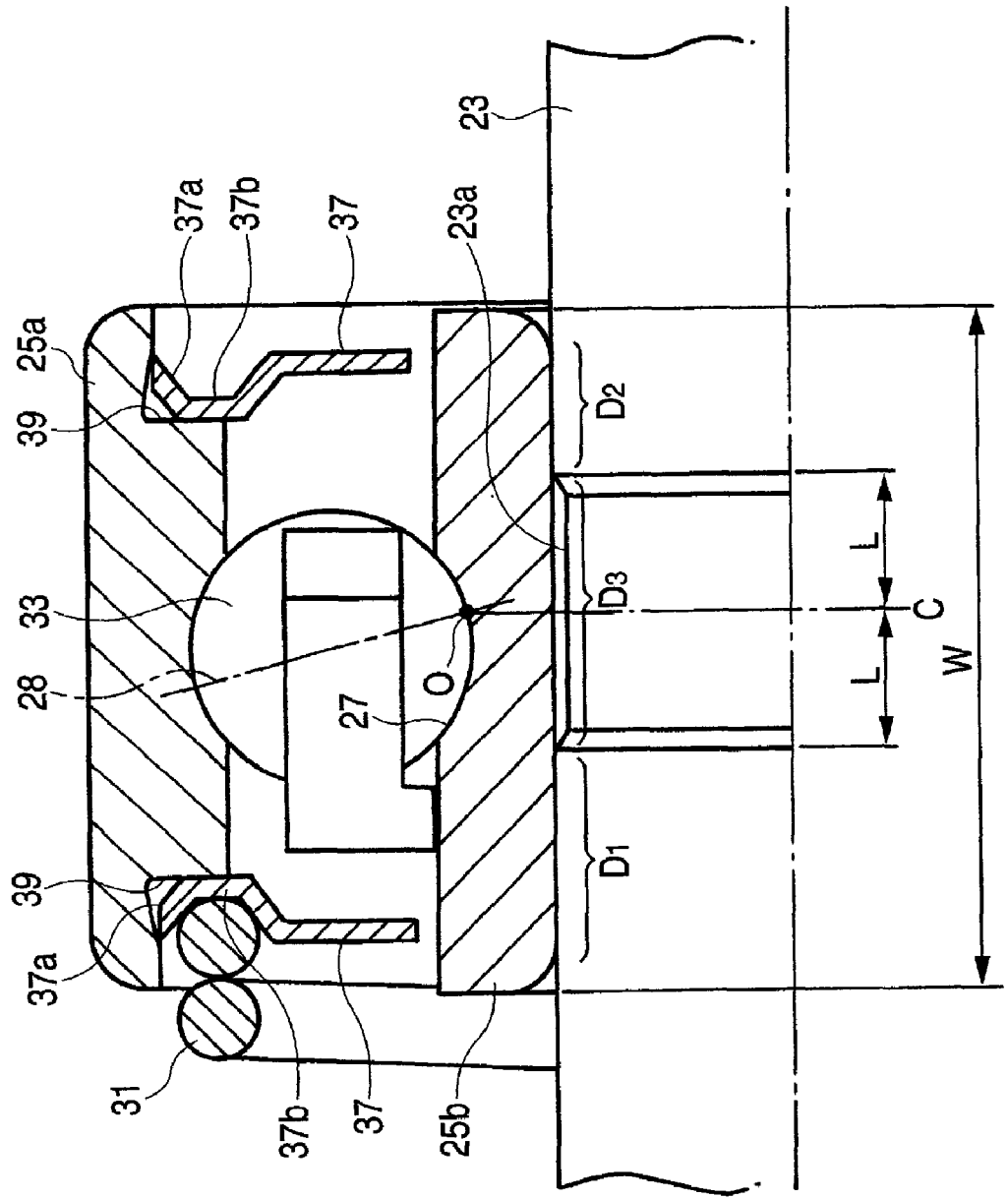
FIG. 2 is an enlarged, sectional view showing a main portion of the bearing unit of FIG. 1.

The bearing units which are preferred embodiments of the present invention will be described with reference to the accompanying drawings. FIG. 1 is a longitudinal sectional view showing a bearing unit which is a first embodiment of the invention. FIG. 2 is an enlarged, sectional view showing a main portion of the bearing unit of FIG. 1.

The bearing unit of the first embodiment is used for rotatably supporting a rotary shaft in various mechanical sections, such as a rotation drive section of an information processing device handling a magnetic recording disc, a magneto-optical recording disc, or the like, a rotation drive section, which requires a silence performance, used for an audiovisual device handling audio and video magnetic recording tapes, and a motor used for a rotation drive section which requires a silence performance.

Specifically, a shaft 23 as a rotary shaft is rotatably supported on a shaft-support housing 29 into which the shaft 23 passes, through a pair of rolling bearings 25, which are fitted to two positions on the shaft 23, which are spaced apart from each other in the axial direction. A compression coil spring 31 is placed between the outer rings 25a of the rolling bearings 25 while being wound around the shaft 23, whereby a preload in such directions as to move apart from each other is applied to the outer rings 25a.

In the present embodiment, the pair of rolling bearings 25 are ball bearings, which are equal in construction. Each bearing is constructed with an inner ring 25b that is press-fitted to the outer circumferential surface of the shaft 23, an outer ring 25a fitted to the inner circumferential surface of the shaft-support housing 29, balls 33 as rolling elements inserted between the inner and outer rings, and a retainer 34 for regulating intervals between the balls 33. Each rolling bearing 25 has a lubricant sealing structure in which sealing plates 37 are provided at both ends of the outer ring 25a in order to prevent lubricant filled between the outer ring 25a and the inner ring 25b from leaking therefrom.

Each sealing plate 37 is fastened to the end of the outer ring 25a such that the outer circumferential surface 37a of the sealing plate 37 is elastically fitted into a stepped part 39, which is axially formed in the outer ring 25a in a spot-facing fashion. Each sealing plate 37 is formed such that a groove 37b as a stepped part into which a wire of an end of the compression coil spring 31 is fitted, circumferentially extends along the outer circumferential surface 37a. When the rolling bearings 25 are assembled to the shaft 23, the grooves 37b of the sealing plates 37 which are located at the inner ends of the outer rings opposed to each other are used as spring seats for positioning and fixing the ends of the compression coil spring 31 that is placed in a compression manner between the pair of rolling bearings 25.

The bearing unit of this embodiment prevents the inner and outer rings 25b and 25a and the balls 33 in the rolling bearings 25 from rattling in the axial direction by the preload of the compression coil spring 31 applied to the outer rings 25a, to thereby realize the reduction of noise generated when the shaft rotates (viz., silencing)

In the bearing unit of the embodiment, the inner ring 25b of each rolling bearing 25 has a uniform inner diameter over its entire width, and is fixed to the shaft 23 by press-fitting. In this case, as shown in FIG. 2, a reduced diameter part 23a whose outer diameter is smaller than the inner diameter of the inner ring 25b is formed on the shaft 23 at a position corresponding to an intermediate part of the inner ring 25b to be press-fitted as viewed in the axial direction.

The reduced diameter part 23a, as shown in FIG. 2, is formed such that a center position C thereof as viewed in the axial direction is set at an intersection point O of the raceway surface 27 of the inner ring to be press-fitted with a contact angle line 28 connecting points at which the ball 33 contacts with the inner and outer rings, and the reduced diameter part extends from the intersecting point O to both sides by a width L. The total width of the reduced diameter part 23a is set to be longer than the entire width of the raceway surface 27.

With provision of the reduced diameter part 23a, as shown in FIG. 2, the inner circumferential surface sections $D_1$ and $D_2$ located at both ends of the inner ring 25b as viewed in the axial direction are interference fitted to the shaft 23. The inner circumferential surface section $D_3$ at the intermediate portion thereof including the raceway surface 27 is clearance fitted to the shaft 23.

In the structure mentioned above, the shaft 23 to which the inner ring 25b of the rolling bearings 25 is press-fitted is designed to have the reduce diameter part 23a whose diameter is smaller than the inner diameter of the inner ring 25b at a position corresponding to the arrangement position of the inner raceway surface 27. The inner ring 25b is clearance fitted to the shaft 23 at the reduced diameter part 23a. In this portion, no stress is generated in the inner ring 25b when it is fitted to the shaft 23. Therefore, the raceway surface 27 is not distorted when the inner ring 25b is press-fitted to the shaft 23.

Accordingly, in the rotation drive sections and the motor employing the bearing unit, there are eliminated disadvantages resulting from a distortion of the raceway surface 27, caused by increase of a vibration at the time of rotation. And, the silence performance is improved and the NRRO is reduced.

Further, the reduced diameter part 23a at which the inner ring 25b is clearance fitted to the shaft 23 is present only at the portion corresponding to the inner raceway surface 27.

The inner circumferential surface sections $D_1$ and $D_2$, which is located on both sides of the inner ring 25b, are interference fitted to the shaft 23. Therefore, the almost full width W of the inner ring 25b effectively regulates a vibration of the shaft 23 in the axial direction, and effectively prevents the occurrence of the inclination between the shaft 23 and the inner ring 25. Accordingly, the vibration and the run-out of the shaft 23 when it is rotated are sufficiently suppressed. Accordingly, there is no possibility that the silence performance is impaired by the vibration and run-out of the shaft 23. Further, the bearing unit prevents degradation of an accuracy of the positioning of the shaft 23 owing to the vibration and run-out of the shaft 23. The satisfactory running performance of the shaft 23 may be maintained stably for a long time.

In the embodiment, the reduced diameter part 23a is formed such that a center position thereof in the axial direction is set to correspond to an intersection point O at which the raceway surface 27 of the inner ring to be press fitted with a contact angle line 28 connecting points at which the ball 33 contacts with the inner and outer rings. This makes clear a positional relationship between the raceway surface 27 and the reduced diameter part 23a on the shaft 23. Accordingly, such a reduced diameter part 23a as to effectively prevent the raceway surface 27 from being distorted, may easily be formed on the shaft 23.

Figure 3:
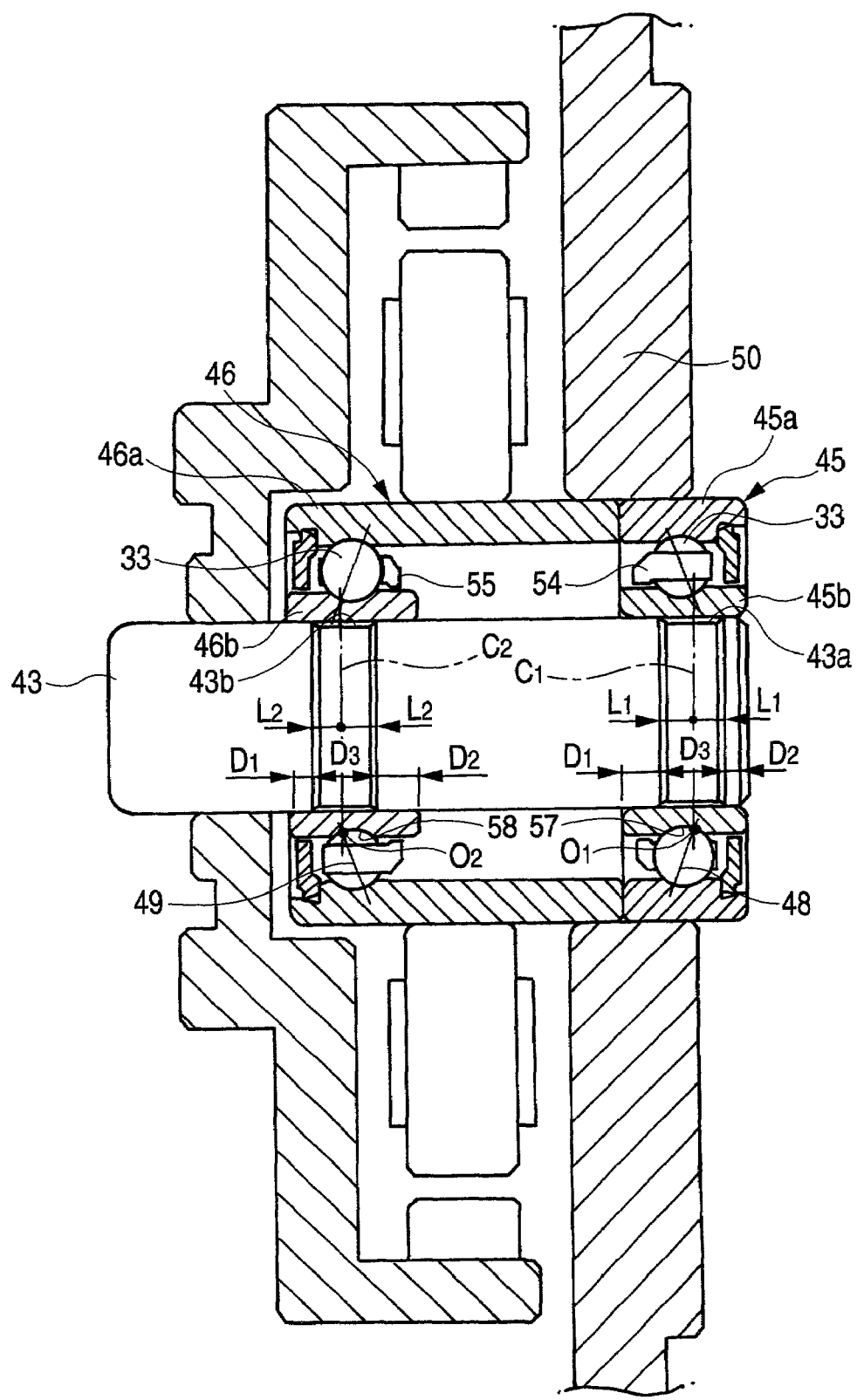
FIG. 3 is a longitudinal sectional view showing a bearing unit which is a second embodiment of the invention.

FIG. 3 is a longitudinal sectional view showing a bearing unit which is a second embodiment of the invention. In the bearing unit of the second embodiment, a shaft 43 is rotatably supported on a shaft-support housing 50 through which the shaft 43 passes, through a pair of rolling bearings 45 and 46, which are fitted to two positions on the shaft 43, which are spaced apart from each other in the axial direction. The inner rings 45b and 46b of the pair of rolling bearings 45 and 46 are fastened to the shaft 43 by press-fitting.

The pair of rolling bearings 45 and 46 are ball bearings constructed so that a plurality of balls 33 are inserted between the outer ring 45a, 46a which are fitted to the shaft-support housing 50 and the inner ring 45b, 46b. An interval between the adjacent balls 33 is defined by a retainer 54, 55.

Of those rolling bearings 45 and 46, one rolling bearing 45 is constructed such that the width of the outer ring 45a is equal to that of the inner ring 45b, but the other rolling bearing 46 is constructed such that the outer ring 46a is wider than the inner ring 46b. In the other rolling bearing 46, the ends of the inner and outer rings are aligned with each other at the outer end. The inner ends of the outer ring 46a is greatly extended toward the rolling bearing 45.

In the bearing unit of the second embodiment, the inner end of the outer ring 46a of the other rolling bearing 46 is brought into contact with the inner end of the outer ring of the one rolling bearing 45, whereby the press-fitting positions at which the inner rings 45b and 46b are approached to each other. Hence, there is applied a preload for eliminating an unnecessary clearance between the ball and the raceway surface of the rolling bearing 45, 46.

In the embodiment, the shaft 43 includes reduced diameter parts 43a and 43b. The reduced diameter part 43a, 43b is located at a portion corresponding to the intermediate portion of the inner ring 45b, 46b to be fitted in the axial direction. The each outside diameter of the reduced diameter parts 43a, 43b is smaller than the each inside diameter of the inner rings 45b, 46b.

The reduced diameter part 43a, 43b, as well as in the first embodiment, is formed such that the center position $C_1$, $C_2$ thereof in the axial direction is set at an intersection point $O_1$, $O_2$ of the raceway surface 57, 58 of the inner ring 45b, 46b to be fitted with a contact angle line 48, 49 connecting points at which the ball 33 contacts with the inner and outer rings.

A length of the reduced diameter part 43a in the axial direction is $2L_1$ where $L_1$=a length ranging from the center position $C_1$ to one side of the reduced diameter part 43a. A length of the reduced diameter part 43b in the axial direction is $2L_2$ where $L_2$=a length ranging from the center position $C_2$ to one side of the reduced diameter part 43b.

The reason why those reduced diameter parts 43a and 43b is the same as in the first embodiment. The inner circumferential surface $D_1$ and $D_2$ of each inner ring 45b, 46b to be press fitted at both ends thereof in the axial direction are interference fitted to the shaft 43 at the reduced diameter part 43a, 43b. The inner circumferential surface $D_3$ of the intermediate portion defining the raceway surface 57, 58 is clearance fitted to the shaft 43, thereby prohibiting a stress caused by the interference fitting from distorting the raceway surface 57, 58.

Figure 4:
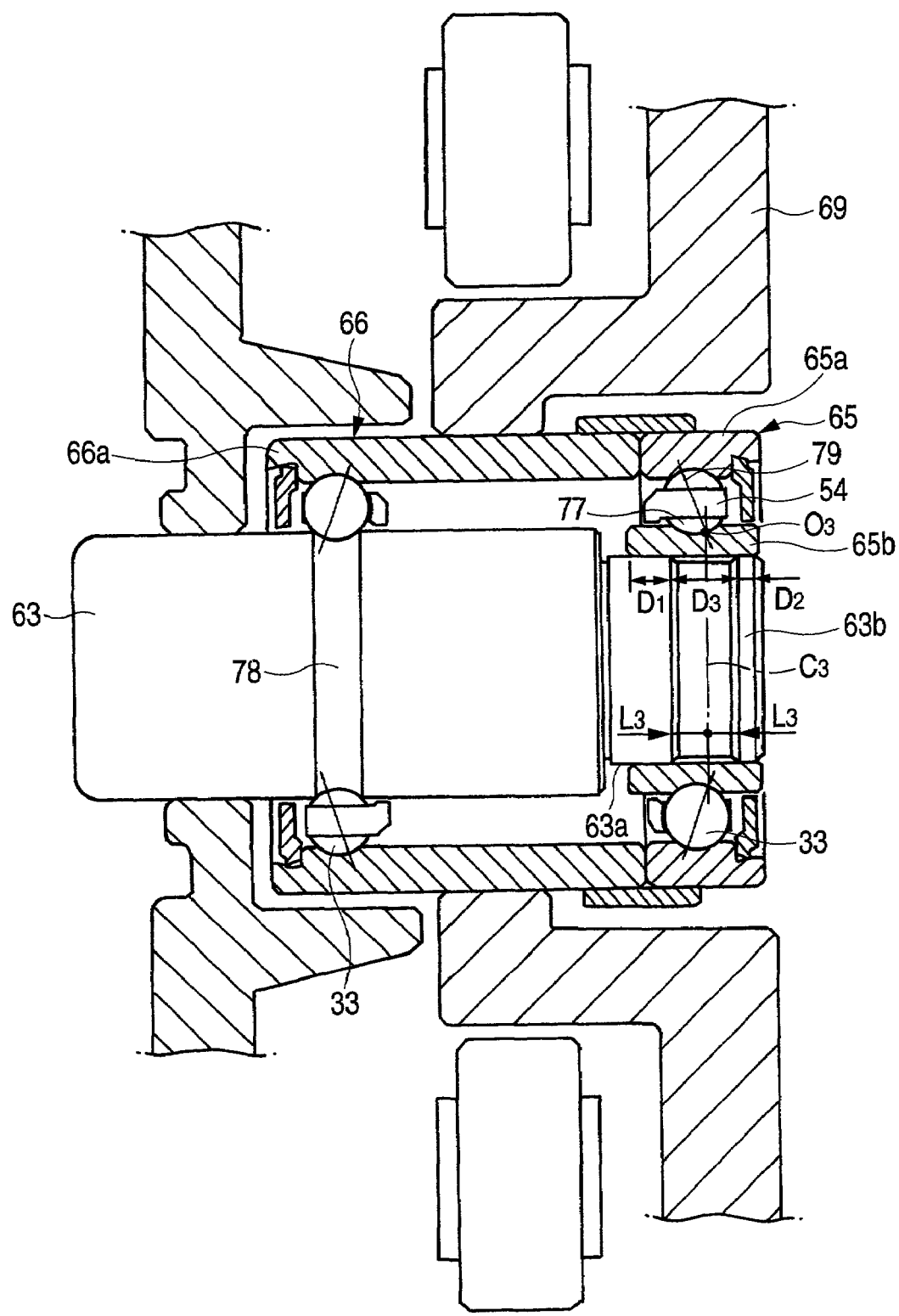
FIG. 4 is a longitudinal sectional view showing a bearing unit which is a third embodiment of the invention.

FIG. 4 is a longitudinal sectional view showing a bearing unit which is a third embodiment of the invention. In the bearing unit of the third embodiment, a shaft 63 is rotatably supported on a shaft-support housing 69 through which the shaft 63 passes, through rolling bearings 65 and 66 which are fitted to two positions on the shaft 63, which are spaced apart from each other in the axial direction. The one rolling bearing 65 is fastened to the shaft 63 by press-fitting the inner ring 65b to the shaft 63.

The pair of rolling bearings 65 and 66 are respectively ball bearings using balls 33 for rolling elements. The other rolling bearing 66 is constructed such that the inner ring is integrally formed with the shaft 63. Accordingly, the diameter of the other rolling bearing 66 is larger than that of the rolling bearing 65. A raceway surface 78 which will serve as a ball rolling groove of the rolling bearing 66 is formed on the outer circumferential surface of the increased diameter part thereof The outer ring 66a of the other rolling bearing 66 is extended in width to the inner side, and the inner end face is brought into contact with the inner end face of the outer ring 65a of the one rolling bearing 65.

In the one rolling bearing 65, a plurality of balls 33 are disposed between the inner ring 65b press fitted to the shaft 63 and the outer ring 65a fitted to the shaft-support housing 69. A retainer 54 regulates an interval between the adjacent balls. A mounting position of the inner ring 65b is set to approach the rolling bearing 66 in a state that the outer ring 65a of the rolling bearing 65 is brought into contact with the outer ring 66a, thereby securing a preload to eliminate a play of those rolling bearings in the axial direction within the bearing.

A reduced diameter part 63b, of which outside diameter is smaller than the inside diameter of the inner ring 65b, is formed on the outer circumferential surface of the small diameter part 63a of shaft 63 to which the inner ring 65b of the rolling bearing 65 is fitted, at a position corresponding to the intermediate portion of the inner ring 65b to be fitted as viewed in the axial direction.

As in the first embodiment, the reduced diameter part 63b is formed such that the center position $C_3$ thereof in the axial direction is set at an intersection point $O_3$ of the raceway surface 77 of the inner ring 65b to be fitted with a contact angle line 79 connecting points at which the ball 33 contacts with the inner and outer rings. A length of the reduced diameter part 63*b* in the axial direction is $2L_3$ where $L_3$=a length ranging from the center position $C_3$ to one side of the reduced diameter part.

The reason why the reduced diameter parts 63*b* are used is the same as in the first embodiment.

Figure 5:
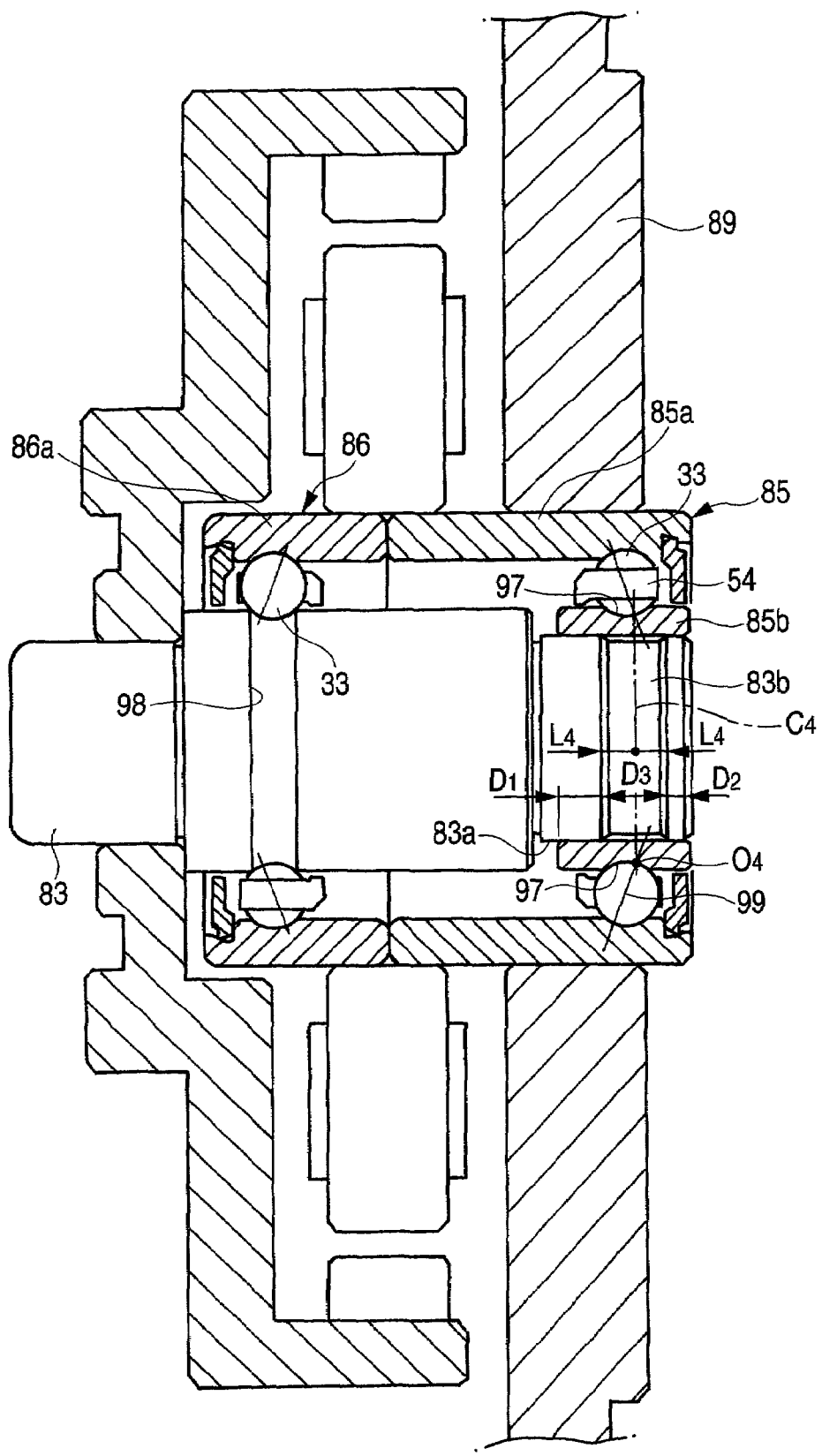
FIG. 5 is a longitudinal sectional view showing a bearing unit which is a fourth embodiment of the invention.

FIG. 5 is a longitudinal sectional view showing a bearing unit which is a fourth embodiment of the invention. In the bearing unit of the fourth embodiment, a shaft 83 is rotatably supported on a shaft-support housing 89 through which the shaft 83 passes, through a pair of rolling bearings 85 and 86, which are fitted to two positions on the shaft 83, which are spaced apart from each other in the axial direction. The one rolling bearing 85 is fastened to the shaft 83 by press-fitting the inner ring 85*b* to the shaft 83.

Those rolling bearings 85 and 86 are each a ball bearing using balls 33 as rolling elements. The other rolling bearing 86 is designed such that the inner ring is integrally formed with the shaft 83. Accordingly, the diameter of the rolling bearing 86 is larger than that of the rolling bearing 85. A raceway surface 98 as a ball rolling groove of the rolling bearing 86 is formed in the outer circumferential surface of the increased diameter part thereof. The outer rings 85*a* and 86*a* of the rolling bearings 85 and 86 are extended in width to the inner side, and the inner end faces of the outer rings are brought into contact with each other.

In the one rolling bearing 85, a plurality of balls 33 are disposed between the inner ring 85*b* press-fitted to the shaft 83 and the outer ring 85*a* fitted to the shaft-support housing 89. A retainer 54 regulates an interval between the adjacent balls. A mounting position of the inner ring 85*b* in the axial direction is set to approach the other rolling bearing 86 in a state that the inner end of the outer ring 85*a* of the rolling bearing 85 is brought into contact with the inner end of the outer ring 86*a*, thereby securing a preload to eliminate a play of those rolling bearings in the axial direction within the bearing.

A reduced diameter part 83*b*, which outside diameter is smaller than the inside diameter of the inner ring 85*b*, is formed in the outer circumferential surface of the small diameter part 83*a* of the shaft 83 to which the inner ring 85*b* of the rolling bearing 85 is fitted, at a portion corresponding to the intermediate portion of the inner ring 85*b* to be fitted as viewed in the axial direction.

As in the first embodiment, the reduced diameter part 83*b* is formed such that the center position $C_4$ thereof in the axial direction is set at an intersection point $O_4$ of the raceway surface 97 of the inner ring 85*b* to be fitted with a contact angle line 99 connecting points at which the ball 33 contacts with the inner and outer rings. A length of the reduced diameter part 83*b* in the axial direction is $2L_4$ where $L_4$=a length ranging from the center position $C_4$ to one side of the reduced diameter part.

The reason why the reduced diameter parts 83*b* are used is the same as in the first embodiment.

According to the invention, a clearance fitting part is obtained by a reduced diameter part formed on the shaft between the inner ring of a bearing to be press-fitted and the shaft. This clearance fitting part may be applied to a bearing unit if it is constructed such that of a pair of rolling bearings, which support the shaft, at least one rolling bearing is constructed such that the inner ring thereof is press-fitted to the shaft. The other rolling bearing may be constructed such that the inner ring is integrally formed with the shaft, as in the third and fourth embodiments. A bearing unit in which the inner ring of the one bearing is press-fitted to the shaft, and the inner ring of the other bearing is bonded to the shaft by adhesive, also falls within the scope of the present invention.

In each embodiment mentioned above, the reduced diameter part which enables the inner ring of the bearing to be clearance fitted to the shaft is formed such that a center position thereof in the axial direction is set at an intersection point of the raceway surface of the inner ring to be press-fitted with a contact angle line connecting points at which the rolling element contacts with the inner and outer rings. It is clear that the position at which the reduced diameter part is formed is not limited to the above-mentioned one. In a specific example, the center position of the reduced diameter part in the axial direction may simply be set at the center of the raceway surface of the inner ring to be press fitted, without considering the contact angle line.

Further, the rolling bearing of the invention may be any other suitable rolling bearing than the ball bearing, while it is the ball bearing in the above-mentioned embodiments.

According to the bearing unit of the first to fourth embodiments, the reduced diameter part which diameter is smaller than the inner diameter of the inner ring is formed on the shaft to which the inner ring of the rolling bearing is press fitted, at a position corresponding to an arrangement position of the inner raceway surface. The inner ring is clearance fitted to the shaft at the reduced diameter part. Accordingly, no stress is generated in the inner ring when it is fitted to the shaft, at the reduced diameter part, thereby preventing the distortion of the inner raceway surface caused by the press fitting of the inner ring.

Accordingly, the bearing unit is free from the problems arising from the distortion of the inner raceway surface, such as the increase of the shaft vibration at the time of rotation in the rotation drive sections or motors which use the bearing unit, to thereby improve the silence performance at the rotation and reduce NRRO.

Further, the reduced diameter part which enables the inner ring to be clearance fitted to the shaft is located only at the portion corresponding to the arrangement position of the inner raceway surface. Both end parts of the inner circumferential surface of the inner ring are interference fitted to the shaft. Therefore, the full width of the inner ring effectively operates for suppressing the run-out of the shaft in the axial direction. Additionally, the full width of the inner ring effectively prevent the occurrence of the inclination between the inner ring and the shaft. Accordingly, the bearing unit satisfactorily suppresses the vibration and run-out of the shaft at the time of shaft rotation. There is no possibility that the silence performance is impaired by the vibration and the run-out of the shaft, and that the positioning accuracy of the shaft is degraded by the vibration and the run-out of the shaft. Good running performance of the shaft is stably maintained for long time.

In a case where the center position of the reduced diameter part is set at the center of the inner raceway surface to be press fitted or set at an intersection point of the raceway surface of the inner ring to be press fitted with a contact angle line connecting points at which the rolling element contacts with the inner and outer rings, a positional relationship between the raceway surface and the reduced diameter part is made clear. Accordingly, the reduced diameter part which is effective in preventing the inner raceway surface from being distorted may easily be formed on the shaft.

Figure 6:
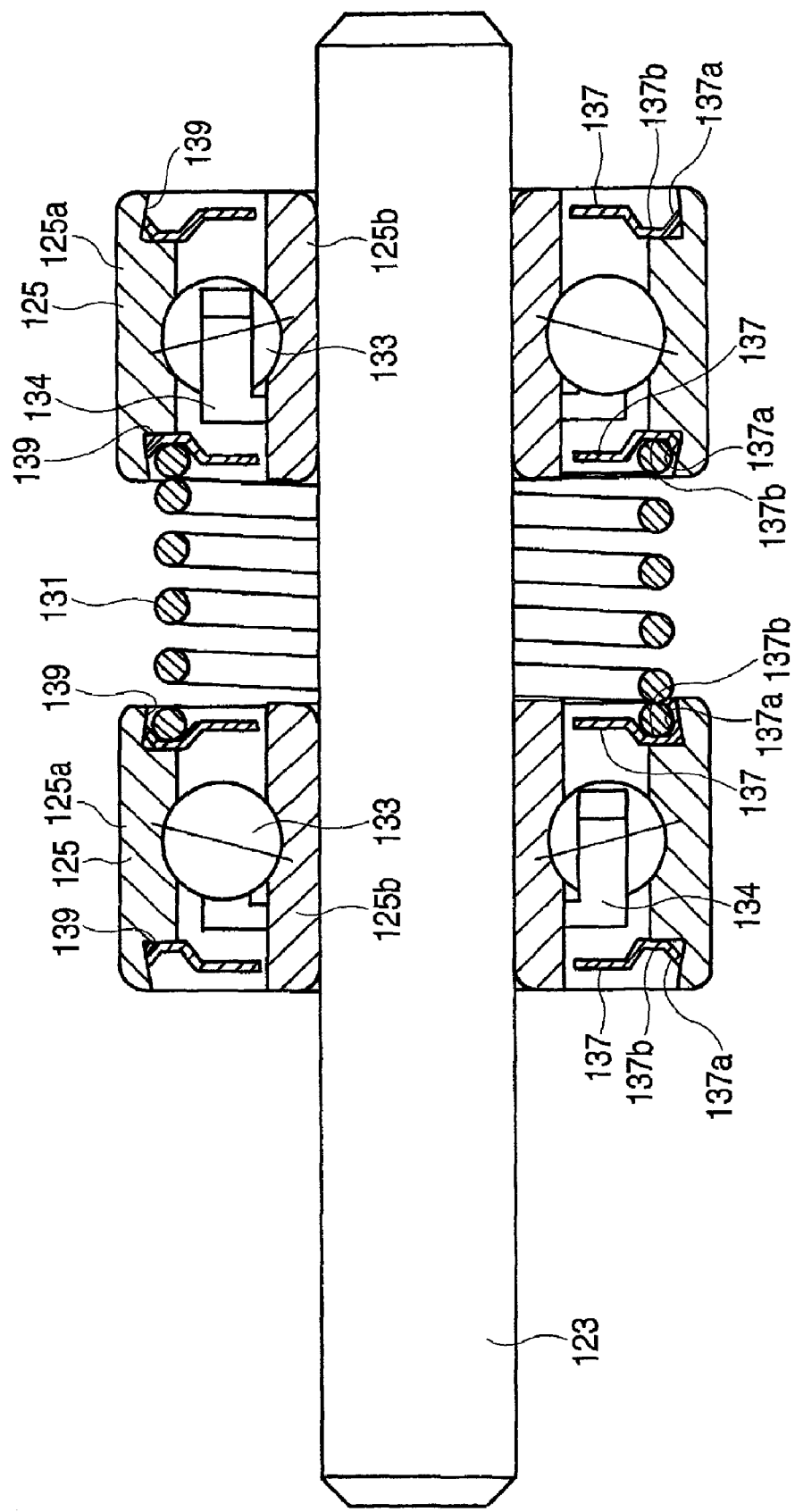
FIG. 6 is a longitudinal sectional view showing a bearing unit which is a fifth embodiment of the invention.

Description will be given of a bearing unit according to a fifth embodiment of the invention with reference to FIG. 6.

The bearing unit of the fifth embodiment is used for rotatably supporting a rotary shaft in various mechanical sections, such as a rotation drive section of an information processing device handling a magnetic recording disc, a magneto-optical recording disc, or the like, a rotation drive section, which requires silence performance, used for an AV device handling audio and video magnetic recording tapes, and a motor used for a rotation drive section which requires silence performance.

Specifically, a shaft 123 as a rotary shaft is rotatably supported on a shaft-support housing (not shown) into which the shaft 123 passes, through two rolling bearings 125, which are fitted to two positions on the shaft 123, which are spaced apart from each other in the axial direction. A compression coil spring 131 is placed between the outer rings 125a of the rolling bearings 125 while being wound around the shaft 123, whereby a preload in such directions as to move apart from each other is applied to the outer rings 125a.

In the present embodiment, the pair of rolling bearings 125 are ball bearings, which are equal in construction. Each bearing is constructed with an inner ring 125b that is press-fitted to the outer circumferential surface of the shaft 123, an outer ring 125a fitted to the inner circumferential surface of the shaft-support housing, balls 133 as rolling elements, and a retainer 134 for regulating intervals between the balls 133. Each rolling bearing 125 has a lubricant oil sealing structure in which sealing plates 137 made with a metal plate, preferably, a cold rolled steel plate are provided at both ends of the outer ring 125a in order to prevent lubricant filled between the outer ring 125a and the inner ring 125b from leaking therefrom.

Each sealing plate 137 is fastened to the end of the outer ring 125a such that the outer circumferential surface 137a of the sealing plate is elastically fitted into stepped part 139, which is axially formed on the outer ring 125a in a spot facing fashion. Each sealing plate 137 is formed such that a groove 137b as a stepped part into which a wire of an end of the compression coil spring 131 is fitted, circumferentially extends along the outer circumferential surface 137a. When the rolling bearings 125 are assembled to the shaft 123, the grooves 137b of the sealing plates 137 which are located at the inner ends of the outer rings opposed to each other are used as spring seats for positioning and fixing the ends of the compression coil spring 131 that is placed in a compression state between the pair of rolling bearings 125.

The bearing unit of this embodiment prevents the rattling of the inner and outer rings 125b and 125a and the balls 133 in the rolling bearings 125 in the axial direction by the preload of the compression coil spring 131 applied to the outer rings 125a, to thereby realize the reduction of noise generated when the shaft rotates (viz., silencing).

In such a construction, since each of the rolling bearing 125 is provided with the sealing plates 137 for preventing lubricant, which is filled in a space between the inner and outer rings 125b and 125a at both the ends of the outer ring 125a, from leaking therefrom, it is possible to prevent a lubricant shortage as the result of lubricant oil leaking and to prevent dust from entering the bearing. Accordingly, it is possible to maintain good lubricating performance for a long time.

Of the sealing plates 137 provided at both ends of each rolling bearing 125, the sealing plates 137 which are located at the inner ends opposed when those are assembled to the shaft 123, serves also as the spring seats supporting the ends of the compression coil spring 131, which applies a preload to the outer rings of the rolling bearings 125. Therefore, there is no need of using an exclusive spring seat, which is manufactured separately from the rolling bearing. Further, the assembling step of the exclusive spring seat is not needed in the assembling. The number of required component parts and the number of assembling steps are reduced.

Accordingly, the reduction of the number of required component parts and the number of assembling steps brings about the following advantages. The reduction of the cost to manufacture the rotation drive section and the improvement of the productivity are achieved. It is possible to maintain good lubricating performance for a long time, and to prevent degradation of the device silencing performance and the reduction of the device lifetime, which result from degradation of the lubricating performance.

In the pair of rolling bearings for supporting the shaft 123, the dimensions and structure thereof may be selected according to the structure of the shaft-support housing to which the rolling bearings are assembled. In a case where the pair of rolling bearings are the same in structure as described in the fifth embodiment, the same type of bearings may be used. Accordingly, the management such as stock is easy. Further, the assembling process is simplified. Additionally, the feature also contributes to reduction of the cost to manufacture the rotation drive section and improvement of productivity.

Figure 7:
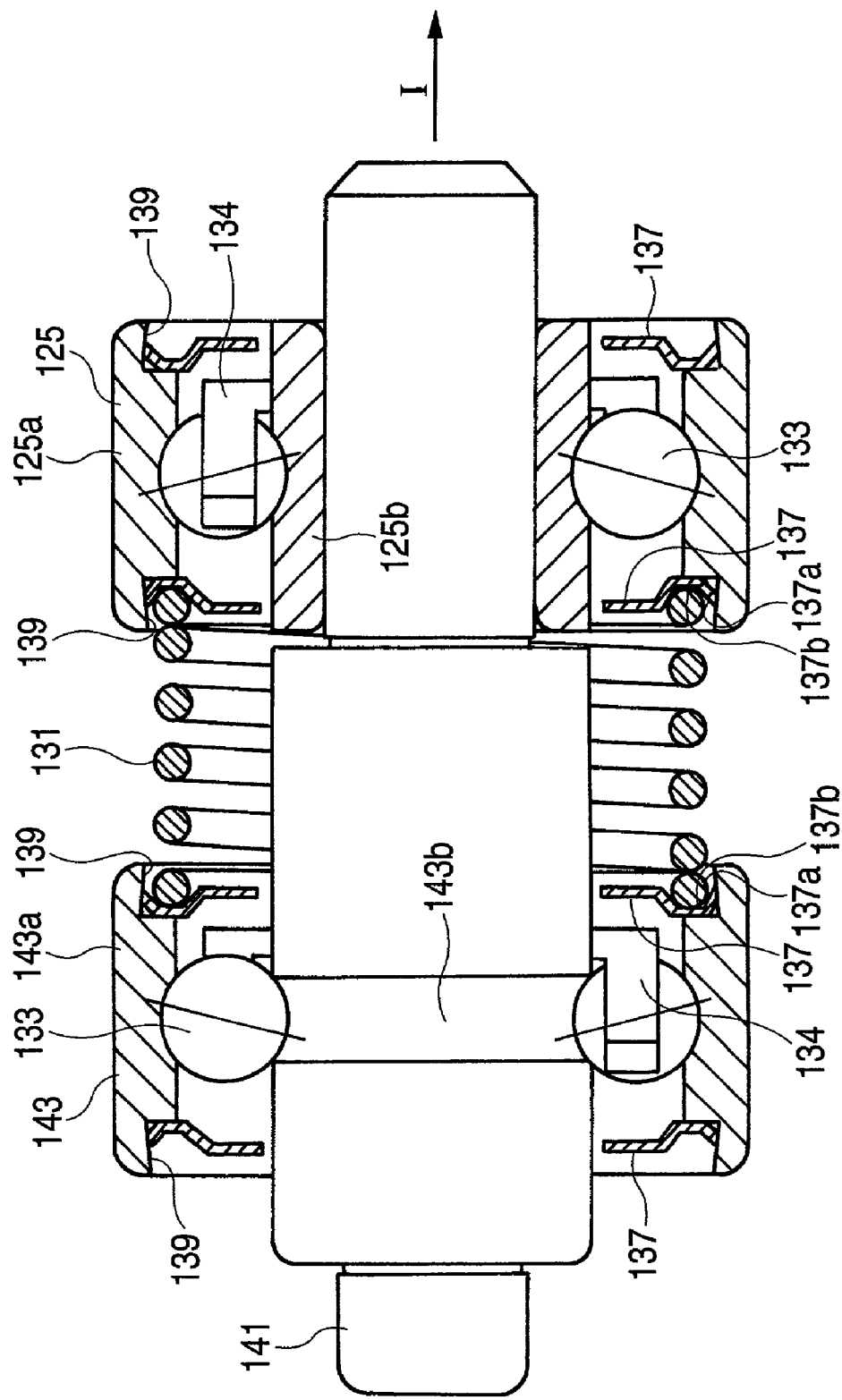
FIG. 7 is a longitudinal sectional view showing a bearing unit which is a sixth embodiment of the invention.

FIG. 7 shows a sixth embodiment of a bearing unit according to the invention.

The bearing unit of the sixth embodiment is a modification of the bearing unit of the fifth embodiment for improvement.

This embodiment is different from the fifth embodiment in structure of the rolling bearings 125 and 143. The rolling bearing 143 located to the left in the figure is constructed such that the dimensions and structure of the outer ring 143a are the same as those of the outer ring 125a of the rolling bearing 125, and the sealing plates 137 which are the same as for the rolling bearing 125 may be fastened to both ends of the outer ring 143a. In addition, the rolling bearing 143 is the same as the rolling bearing 125 in that the interval between the adjacent balls 133 as rolling elements, which are disposed between the inner and outer rings, is defined by the retainer 134. However, the rolling bearing 143 is constructed such that the inner ring is integrally formed with the shaft 141.

The diameter of a part of the shaft 141, which is closer to the rolling bearing 143, is enlarged so that it serves also as the inner ring of the rolling bearing 143. The raceway surface 143b on which the balls 133 as rolling elements roll is formed on the outer circumferential surface of the enlarged diameter part of the shaft 141.

This embodiment is similar to the fifth embodiment in that the pair of sealing plates 137 provided the inner ends of the outer rings 125a and 143a of the rolling bearings 125 and 143, which are opposed to each other, are used as spring seats for positioning the ends of the compression coil spring 131, which is located between the rolling bearings 125 and 143.

In the mechanical arrangement of the sixth embodiment, the number of components parts used for assembling is reduced since the inner ring of rolling bearing 143 is integral with the shaft 141. Further, the axially positioning accuracy between the rolling bearing 143 and the shaft 141 is increased. Accordingly, the shaft run-out accuracy and the shaft rigidity are also improved when comparing with those in the fifth embodiment.

When it is assembled to the shaft-support housing by press-fitting in the direction of an arrow I, the stepped part of the enlarged diameter part of the shaft 141 is brought into contact with the inner ring 125b, to thereby stop a displacement of the rolling bearing 125. As a result, the assembling of it to the shaft-support housing is easy.

Figure 8:
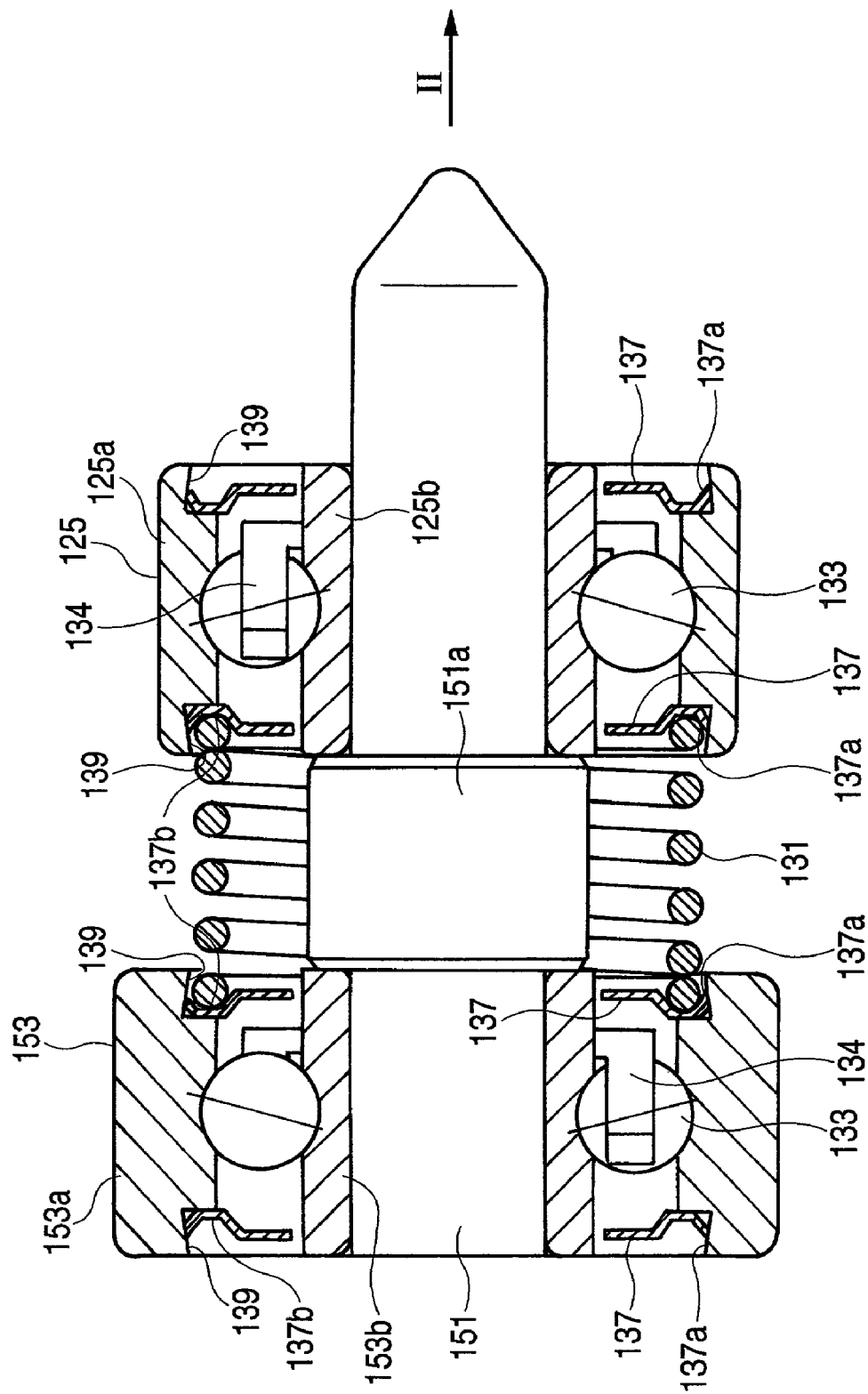
FIG. 8 is a longitudinal sectional view showing a bearing unit which is a seventh embodiment of the invention.

FIG. 8 shows a seventh embodiment of a bearing unit according to the present invention.

The bearing unit of the seventh embodiment is a modification of the bearing unit of the fifth embodiment for improvement.

The embodiment different from the fifth embodiment resides in structure of the pair of rolling bearings 125 and 153. The rolling bearing 153 located to the left in the figure is constructed such that the dimensions and structure of the inner ring 153 are the same as those of the inner ring 125b of the rolling bearing 125. Also for the outer ring 153a, the stepped part 139 to which the outer circumferential surface 137a of the sealing plate 137 is fitted, is formed in each of the end faces of the outer ring so that the sealing plate 137 common to the rolling bearing 125 may be formed on each of the ends thereof.

The rolling bearing 153 is the same as rolling bearing 125 in that the interval between the adjacent balls 133 as the rolling elements disposed between the inner and outer rings is regulated by the retainer 134. However, the rolling bearing 153 is constructed such that the outer ring 153a is thicker than the outer ring 125a of the rolling bearing 125. Further, an enlarged diameter part 151a for positioning the inner rings 125b, 153b is formed on the shaft 151 at the intermediate portion thereof.

The embodiment is similar to the fifth embodiment in that the sealing plates 137 which are located at the inner ends of the outer rings 125a, 153a of the rolling bearings 125 and 153 which are opposed to each other are used as spring seats for positioning and fixing the ends of the compression coil spring 131 that is placed in a compression state between the pair of rolling bearings 125.

According to the construction of the seventh embodiment, since the outside diameter of rolling bearing 125 is different from that of the rolling bearing 153, the structure of the shaft-support housing may have a stepped part as defined by the outside diameter of each bearing. When its mounting to the shaft-support housing is performed by press-fitting rolling bearing 153 of large diameter in the direction of an arrow II in FIG. 8, the press-fitting work is easy. The assembling process management is easy and the productivity of the rotation drive section is improved when comparing with the fifth embodiment. In this case, the rolling bearing 125 of small diameter is bonded to the shaft-support housing by adhesive.

Figure 9:
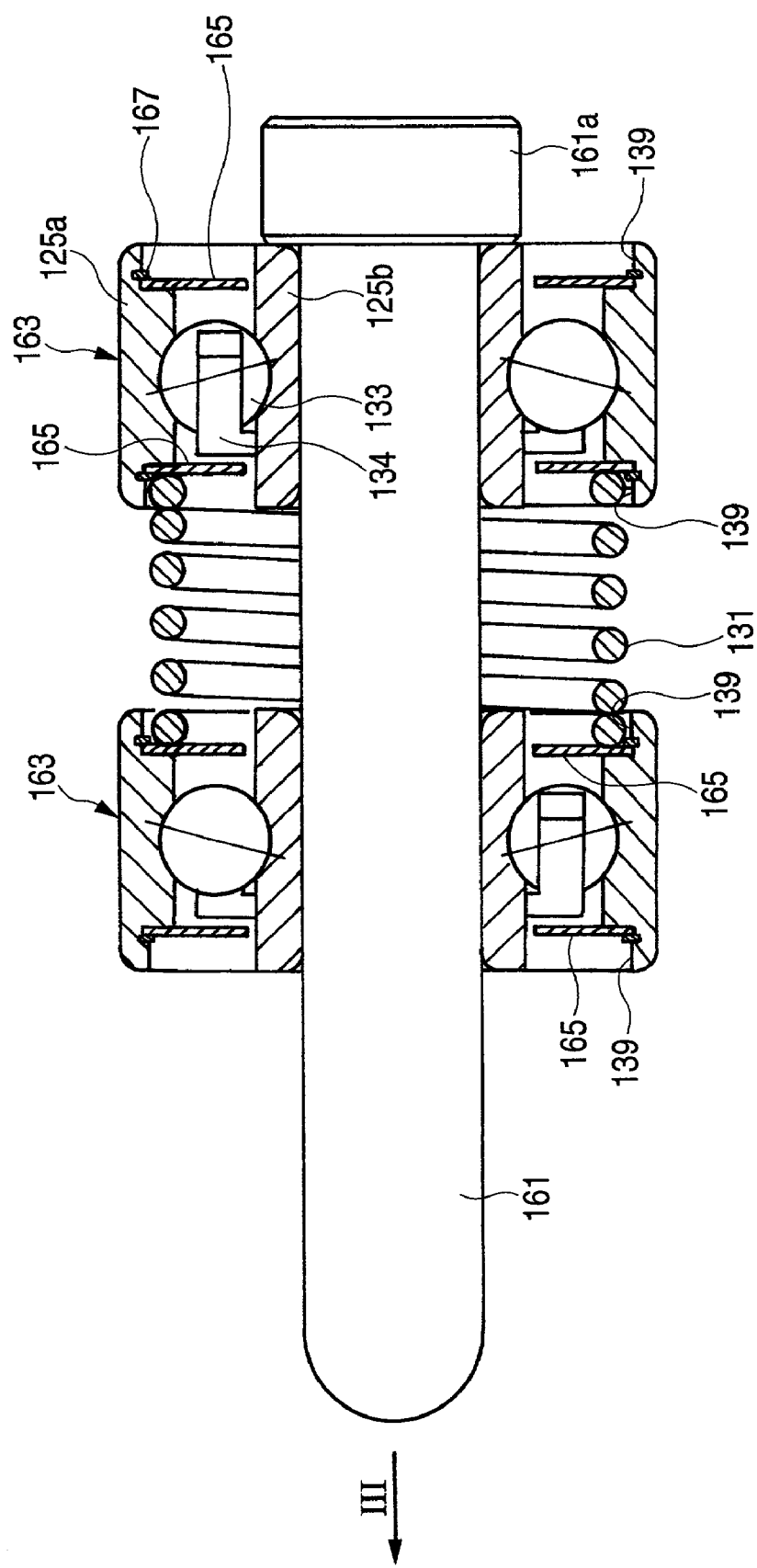
FIG. 9 is a longitudinal sectional view showing a bearing unit which is an eighth embodiment of the invention.

FIG. 9 shows an eighth embodiment of a bearing unit according to the invention.

The bearing unit of the eighth embodiment is a modification of the bearing unit of the fifth embodiment for improvement.

A difference of the embodiment different from the fifth embodiment resides in that the sealing plate 165 fitted to the stepped part 139, which is formed on each of the ends of the outer ring 125 in order to prevent the lubricant filling the space between the inner and outer rings from leaking, has a simple doughnut plate structure having no stepped part on the surface.

The rolling bearing 163 is different from the rolling bearing 125 of the fifth embodiment only in the sealing plate 165. The sealing plate 165 is brought into engagement with the stepped part 139 formed in each of the ends of the rolling bearing 125 by means of a stop ring 167, e.g., a C ring.

In the embodiment, the stepped part 139 per se on the inner end of the outer ring 125a of each of the opposed rolling bearings 163 is used as the spring seat for positioning the ends of the compression coil spring 131 located between the rolling bearings 163.

The rolling bearings 163 are mounted on the shaft-support housing by press-fitting them in the direction of an arrow III after the shaft 161 is assembled.

A rear end portion of the shaft 161 as viewed in the press-fitting direction forms an enlarged diameter part 161a for stopping an axial displacement of the rolling bearing 163.

Where the construction of the eighth embodiment is used, the sealing plate 165 takes the form of a simple planner plate. As a result, the cost of manufacturing the sealing plate 165 is reduced, so that the cost of manufacturing the rolling bearing 163.

FIGS. 10A and 10B show a ninth embodiment of a bearing unit according to the invention.

The bearing unit of the ninth embodiment is a modification of the bearing unit of the fifth embodiment for improvement.

This embodiment is different from the fifth embodiment in that, in addition to the sealing plate 137 which is fitted to the stepped part 139 formed on each of the ends of the outer ring 125 and prevents the lubricant filled in the space between the inner and outer rings from leaking, there is provided a stop ring 177 pressing the sealing plate 137 toward the inside of the bearing.

The stop ring 177 is made of spring steel, and has a cutting portion cut at apart of the outer periphery thereof. Further, the stepped part 139 of the outer ring 125a is formed with a tapered portion 178 butting with an outer edge 177a of the stop ring 177, as shown in FIG. 10B.

Thus, the stop ring 177 is inserted into the stepped part 139 in a state that the stop ring 177 is deformed so as to close the cutting portion. After the insertion, when the stop ring 177 is restored by a spring force of itself, the outer edge 177a is contacted with the tapered portion 178. Then, the stop ring 177 presses the sealing plate 137 toward the inside of the bearing by a reactive force obtained from the tapered portion 178.

A gap α is defined between a standing wall 139a of the stepped part 139 and the stop ring 177, for the secure pressing of the sealing plate 137.

And, in case of this embodiment, the sealing plate 137 and the stop ring 177 mounted on the inner end sides of the outer rings 125a of the pair of opposing rolling bearings 173 serve as a spring seat for positioning the end portion of the compression coil spring 131, which is assembled between the pair of rolling bearings 173.

After the pair of rolling bearings 173 are assembled to the shaft 161, the rolling bearings 173 are press-fitted in a direction shown in a arrow IV of FIG. 10A, so as to be attached to the shaft-support housing.

The bearing unit according to the ninth embodiment can securely press the sealing plate 137 toward the inside of the housing, and can securely prevent the sealing plate 137 and the stop ring 177 from occurring the vibration noise.

As described above, the rotary shaft to which the bearings are assembled may appropriately have the stepped part according to the press-fitting direction at the time of assembling.

The diameter of the inner and outer rings of the pair of rolling bearings, which are mounted on the rotary shaft may be varied in accordance with the shaft-support housing to be press-fitted.

The rolling elements located between the inner and outer rings are not limited to the balls. The structure of the sealing plate disposed on each of the ends of the outer ring is also not limited to the above mentioned. It is clear that the component parts may be modified, altered and changed within the scope of the invention.

With such a construction of the bearing unit of the fifth to the ninth embodiment of the invention, each of the rolling bearing is provided with sealing plates for preventing lubricant oil, which fills a space between the inner and outer rings at both the ends of the outer ring, from leaking therefrom. Therefore, it is possible to prevent a lubricant shortage as the result of a lubricant leaking and to prevent dust from entering the bearing. Accordingly, it is possible to maintain good lubricating performance for a long time.

Of the sealing plates provided at both ends of each rolling bearing, the sealing plates which are located at the inner ends opposed when those are assembled to the shaft, serves also as the spring seats supporting the ends of the compression coil spring, which applies a preload to the outer rings of the rolling bearings. There is no need of using an exclusive spring seat, which is manufactured separately from the rolling bearing. Further, the assembling step of the exclusive spring seat is not needed in the assembling. The number of required component parts and the number of assembling steps are reduced.

The reduction of the number of required component parts and the number of assembling steps brings about the following advantages. The reduction of the cost to manufacture the rotation drive section and the improvement of the productivity are achieved. It is possible to maintain good lubricating performance for a long time, and to prevent degradation of the device silencing performance and the reduction of the device lifetime, which result from degradation of the lubricating performance.

Next, a description will be given of a bearing unit according to a tenth embodiment of the present invention with reference to FIG. 11.

Figure 11:
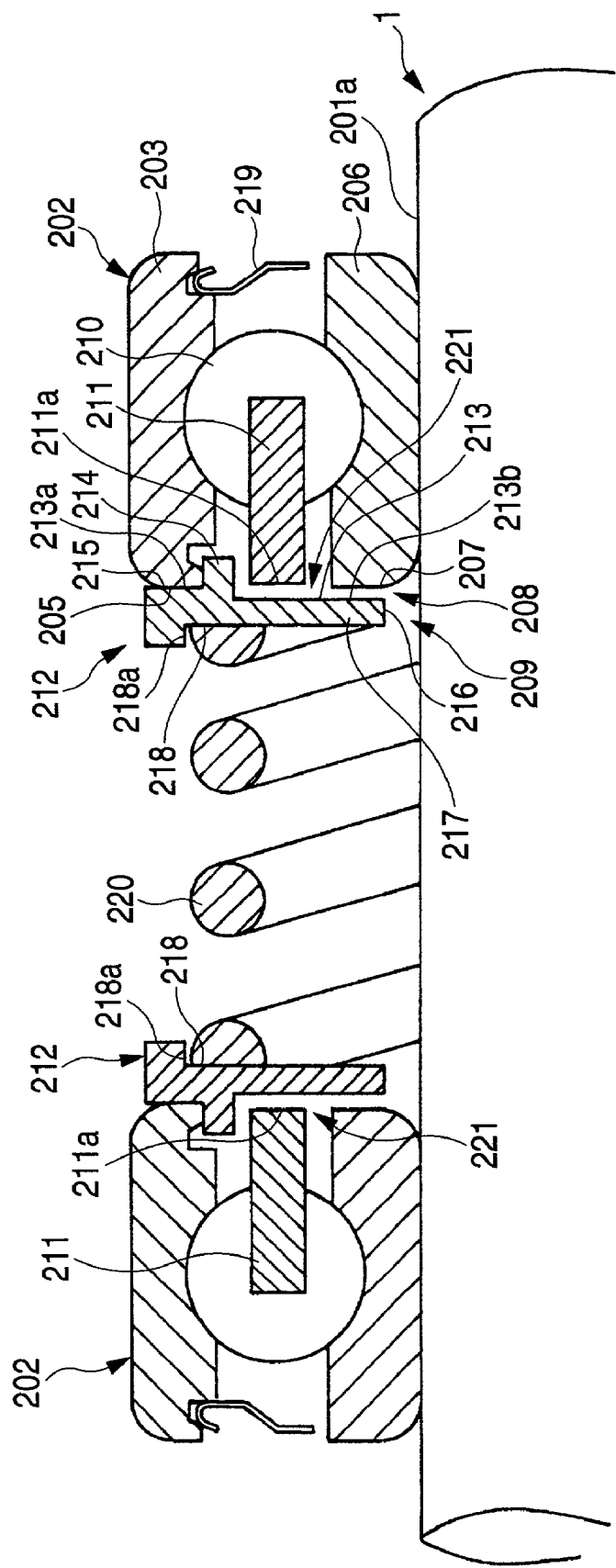
FIG. 11 is a longitudinal sectional view showing a bearing unit, partly omitted, according to a ninth embodiment of the invention.

In the bearing unit shown in FIG. 11, two bearings 202 are press-fitted to an outer surface 201a of a shaft 201, and a coil spring 220 for applying a preload is provided between the two bearings 202.

Each of the bearings 202 includes an outer ring 203, an inner ring 206, a plurality of rolling elements 210 inserted into a space between the outer and inner rings 203 and 206, and a retainer 211 for guiding the rolling elements 210.

Spring seats 212 serving also as sealing plates are disposed on facing sides of the bearings 202, which face with each other. And, Sealing plates 219 are disposed on non-facing sides of the bearings 202, which are opposite to the inner end sides. The retainer 211 is inserted in a state that a back surface 211a thereof faces the spring seat 212.

Specifically, one side of the bearing 202, which is the facing sides of the bearings 202, and also the back surface side 211a of the retainer 211, is opened, that is, the sealing plate is not located on the facing side. The spring seat 212 serving also as a sealing plate is located on the opened facing side.

The spring seat 212 is formed in an annular shape whose outer diameter is larger than the inside diameter of the outer ring 203. A fitting collar 214 is axially extended from a part of an outer surface 213 of the spring seat 212. The fitting collar 214 is fitted to the outer ring 203 in the one side of the bearing, which is the opened side of the bearing without the sealing plate 219, and a side facing the back side 211a.

An inner surface 217 of the spring seat 212 serves as a spring receiving surface, and the spring seat serves as a sealing plate (shield) facing the back side of the retainer.

An axially positioning butting part 215 is formed on the outer surface (bearing facing surface) 213 of the spring seat 212. When the spring seat 212 is securely fitted to the outer ring 203, by butting the axially positioning butting part 215 against a predetermined location (butting area) of the outer ring 203, a retainer-interference avoiding clearance 221 is formed between the outer surface 213 of the spring seat 212 and the back side 211a of the retainer 211. The retainer-interference avoiding clearance 221 is a clearance space which functions to avoid such a situation that when the spring seat 212 is fixed to the outer ring 203, the outer surface 213 of the spring seat 212 interferes with the back side 211a.

Specifically, a spring seat outer surface 213a located above the fitting collar 214 is used as the axially positioning butting part 215. The axially positioning butting part 215 is butted against a flat surface (butting face) 205 of the outer ring 203. In this case, the retainer-interference avoiding clearance 221 is formed in a manner that a spring-seat outer side 213b below the fitting collar 214 is located closer to the inner surface 217 than the outer side 213a above the fitting collar 214, so as to have a predetermined distance between the outer surface 213 and the back side 211a.

In this embodiment, an extremely narrow labyrinth 208 is formed between the outer surface 213 at a position close to the inner surface of the spring seat 212 and the flat surface 207 of the inner ring 203. An extremely narrow labyrinth 209 is provided between the inner diameter end 216 of the spring seat 212 and the outer surface 201a of the shaft 201.

The upper end (outside diameter) of the inner surface of the spring seat 212 has an outer side portion 218a extended in the axial direction, and the outer diameter side portion 218a serves as the radially positioning step 218.

Accordingly, the spring 220 disposed between the bearings 202 press fitted to the shaft 201 is stably held by the spring seats 212. There is no possibility that it enters the bearing or moves out of the bearing. Further, the retainer-interference avoiding clearance 221 for avoiding the interference of the spring seat 212 with the back side 211a of the retainer 211 is provided between the spring seat 212 and the back side 211a of the retainer 211. Therefore, even in such a case where the space between the bearings 202 is narrow, and the sealing plate may interfere with the retainer, if the spring seats 212 are used in place of the sealing plates, it has the function of the spring seat and also the function of the sealing plate.

Further, the bearing width may be reduced while avoiding its interference with the retainer. Therefore, the center-to-center distance (span) between the bearings oppositely disposed maybe set to be large, there by increasing its moment rigidity.

Figure 12:
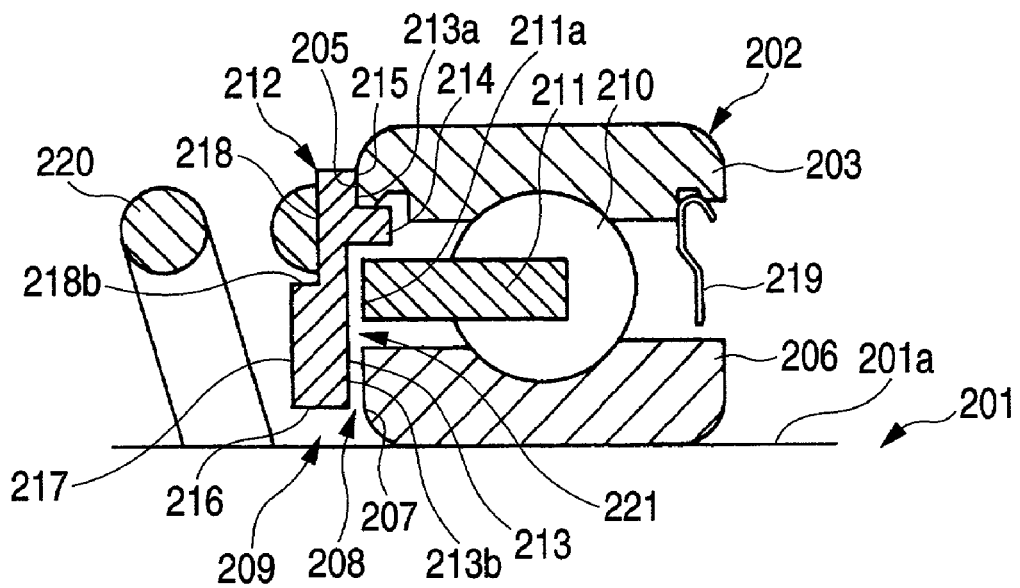
FIG. 12 is a longitudinal sectional view showing a bearing unit, partly omitted, according to a tenth embodiment of the invention.

A description will be given of a bearing unit according to an eleventh embodiment of the invention with reference to FIG. 12.

The bearing unit of this embodiment is similar to that of the tenth embodiment, and is different from the latter in that the upper end (outside diameter) of the inner surface 217 of the spring seat 212 is recessed, whereby an inner side portion 218b is used as the radially positioning step 218. The remaining construction and operation of the embodiment are similar to those of the tenth embodiment.

Figure 13:
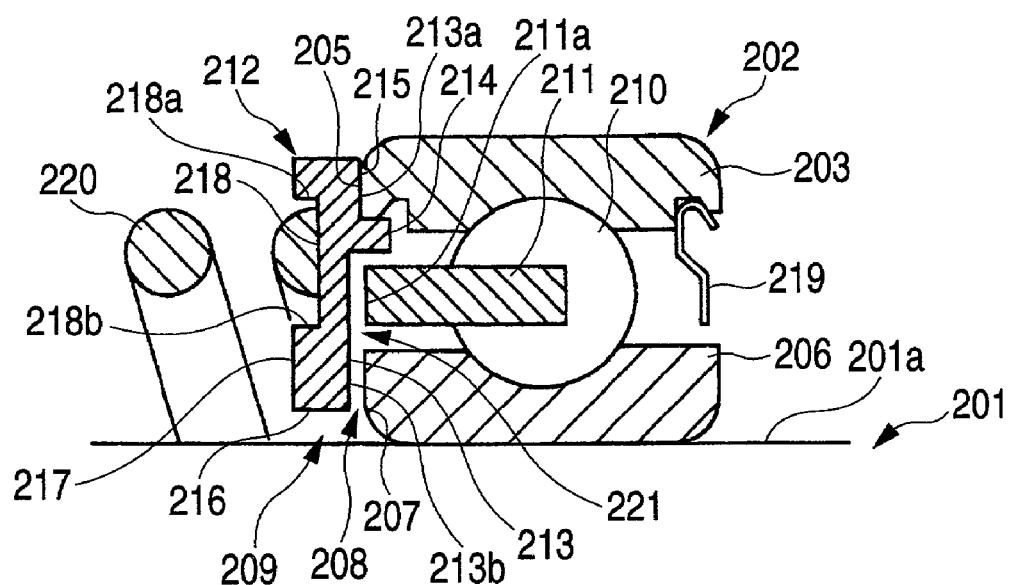
FIG. 13 is a longitudinal sectional view showing a bearing unit, partly omitted, according to an eleventh embodiment of the invention.

A description will be given of a bearing unit according to a twelfth embodiment of the invention with reference to FIG. 13.

The bearing unit of this embodiment is similar to that of the tenth embodiment, and is different from the latter in that the inner surface 217 is recessed, whereby an inner side portion 218b and the outer side portion 218a are used for the radially positioning step 218. The remaining construction and operation of the embodiment are similar to those of the tenth embodiment.

Figure 14:
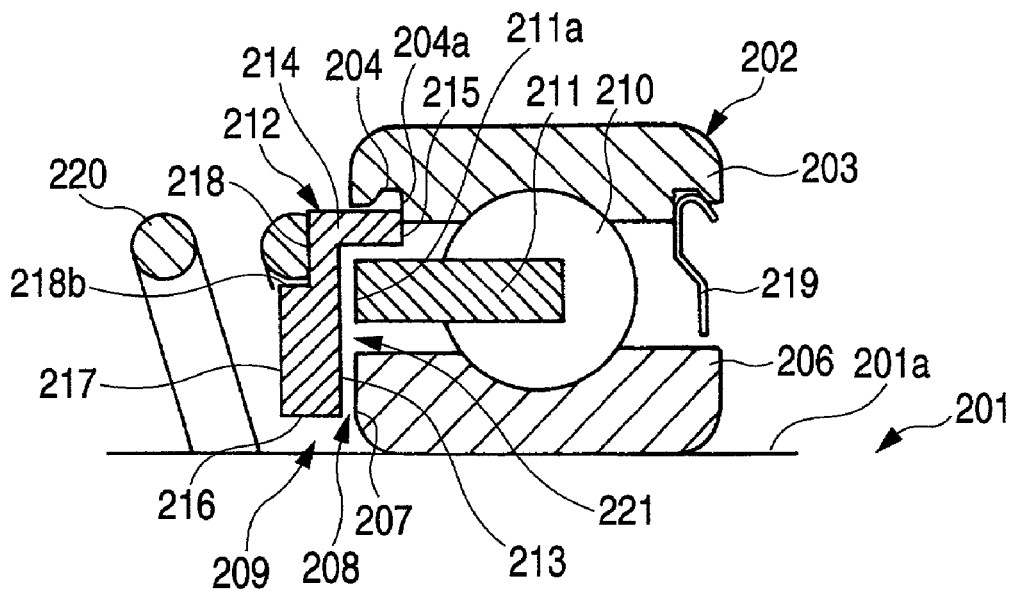
FIG. 14 is a longitudinal sectional view showing a bearing unit, partly omitted, according to a twelfth embodiment of the invention.

Next, a description will be given of a bearing unit according to a thirteenth embodiment of the invention with reference to FIG. 14.

In this embodiment, the upper end (outside direction) of the spring seat 212 is axially extended to form the fitting collar 214. The end face of the fitting collar 214 is used as the axially positioning butting part 215.

Specifically, the axially positioning butting part 215 is butted against a wall surface 204a of a sealing groove 204 of the outer ring 203. In this case, the outer surface 213b below the fitting collar 214 is located closer to the inner surface 217 than the axially positioning butting part 215, whereby a retainer-interference avoiding clearance 221 with a predetermined distance is formed between the outer surface 213b below the fitting collar 214 and the back side 211a of the retainer 211.

The construction of the radially positioning step 218 resembles that of the eleventh embodiment. The remaining construction and operation of the embodiment are similar to those of the tenth embodiment.

Figure 15:
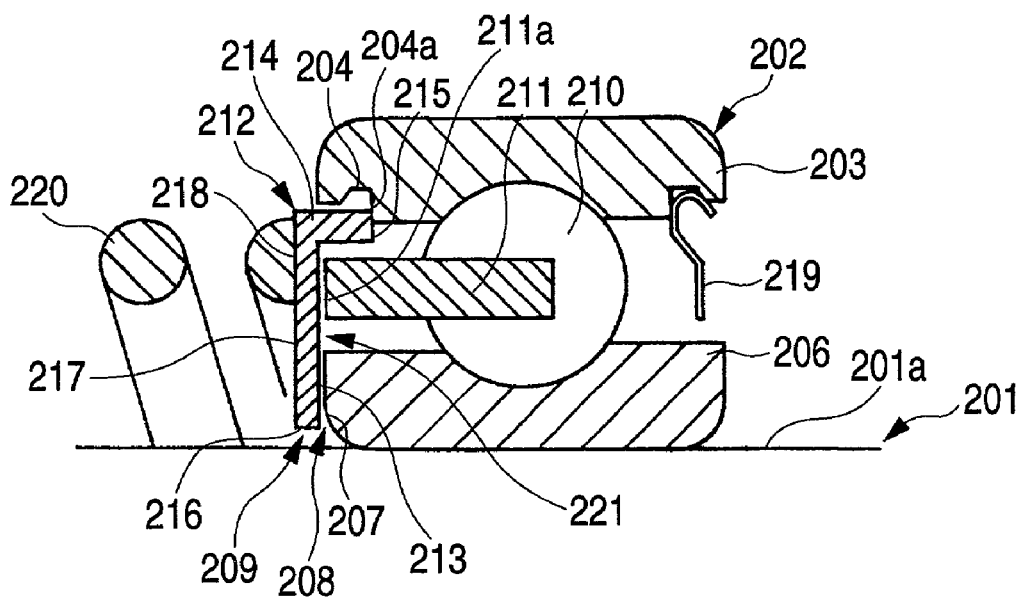
FIG. 15 is a longitudinal sectional view showing a bearing unit, partly omitted, according to a thirteenth embodiment of the invention.

A description will be given of a bearing unit according to a fourteenth embodiment of the invention with reference to FIG. 15.

The bearing unit of this embodiment is similar to that of the thirteenth embodiment, and is different from the latter in that the radially positioning step 218 of the spring 220 is not provided on the inner surface 217, and the spring 220 is directly received by the inner surface 217. The remaining construction and operation of the embodiment are similar to those of the tenth embodiment.

It should be understood that the above bearing units is one form of the bearing units constructed according to the invention, and may variously be modified within the scope of the invention.

The sealing plates 219 disposed on the non-facing sides of the two bearings 202 are not limited to the one having a specific structure, but maybe well known non-contact seals, non-contact shields or contact seals.

The bearings 202 are each press fitted in a state that an interference matching the axial load is provided between the inner diameter of the inside ring 206 and the outer diameter of the shaft 201 in order to prevent the bearing from shifting from the fitting portion when a large load axially acts or a load of impact due to the dropping axially acts.

But, in case that the interference may be selected to be small to such an extent that a clearance is formed at the fitting portion and the run-out due to an eccentricity thereof is not caused, adhesive is used for supporting the axially acting load. Thus, the bearing is securely press-fitted and adhered to the shaft by utilizing the combination of the small interference and the adhesive.

The outer ring 203, the inner ring 206 and the rolling elements 210, which are illustrated, may be substituted by other suitable ones.

The spring seat 212 may be made of metal, synthetic resin, rubber or the like. Use of synthetic resin is preferable since it is low in cost.

Further, the retainer-interference avoiding clearance 221 may be variously formed, provided that the outer surface 213 of the spring seat 212 facing the back side 211a of the retainer 211 is spaced by such a distance as not to interfere with the back side 211a when the axially positioning butting part 215 is butted against a desired location of the outer ring 203 such that the spring seat 212 is fitted to the outer ring 203.

In the embodiment, the outer surface 213 of the spring seat 212, which forms the retainer-interference avoiding clearance 221 in corporation with the back side 211a, is extended straight in the radial direction. In place of this shape, a groove (not shown) may be circumferentially formed in the inner surface of the spring seat 212 at a position opposed to the back side 211a of the retainer 211. The groove thus formed is used as a space for avoiding the interference of the outer surface of the spring seat with the retainer. Further, a space for the retainer-interference avoiding clearance may be formed in any other suitable way.

The outer surface 213 of the spring seat 212 does not contact with the inner ring 206 when the axially positioning butting part 215 is butted against a desired location of the outer surface 213.

The fitting collar 214 which is formed on the outer surface 213 at a desired location may be circumferentially continuous or discontinuous.

Further, the spring seat 212 may be formed to extend to the inner ring side in the radial direction, so that a labyrinth 208 as a narrow clearance is formed between the outer surface 213 closer to the inner side of the spring seat and a flat surface 207 of the inner ring, whereby the dust-proof performance of the bearing unit is improved.

In addition, a further improvement of the dust-proof performance may be made in a manner that the inner diameter end of the spring seat is further extended to the radial direction to form a labyrinth 209 as a narrow clearance between the inner diameter end 216 of the spring seat and the outer surface 201a of the shaft 201.

The labyrinth 208, which is formed between the spring seat outer surface 213 closer to the inner side and the flat surface 207 of the inner ring 203, maybe formed as an intricate and narrow labyrinth path in a manner that the outer surface 213 and/or the flat surface 207 is formed in a curved shape (a convexoconcave shape or a wavy shape) in cross section.

Even the labyrinth 209, which is formed between the inner diameter end 216 and the outer surface 201a, may be formed as an intricate and narrow labyrinth path in a manner that the inner side end 216 and/or the outer surface 201a is formed in a curved shape (a convexoconcave shape or a wavy shape) in cross section.

The spring seat 212 may be formed so that the inner surface 217 being a facing surface of the counter spring seat 212, which is in contact with the spring 220 has a straight shape in the radial direction. Alternatively, a radially positioning step 218 for radially positioning the spring 220 may be provided at a desired position on the inner surface 217. By so doing, the attitude and position of the spring 220 may be corrected. As described in the above embodiments, the radially positioning step 218 of the spring 220 may be variously designed.

While the coil spring (partly omitted in the figure) is used for the spring 220 in the above embodiments, a coned disk spring may be used in place of the coil spring when the space between the bearings 202 is narrow.

A spring for preload between the two bearings press-fitted to the shaft may stably be installed to the bearing of the type in which the sealing plate (shield) cannot be installed since its width is narrow and it interferes with the retainer on the back side thereof.

According to the invention, the bearing unit is formed so that the width of the bearing structure is narrow, while having the operation and effects as mentioned above. Therefore, the center-to-center distance (span) between the bearings oppositely disposed may be set to be large, thereby increasing its moment rigidity.

A fifteenth embodiment of the present invention will be described with reference to FIG. 16.

Figure 16:
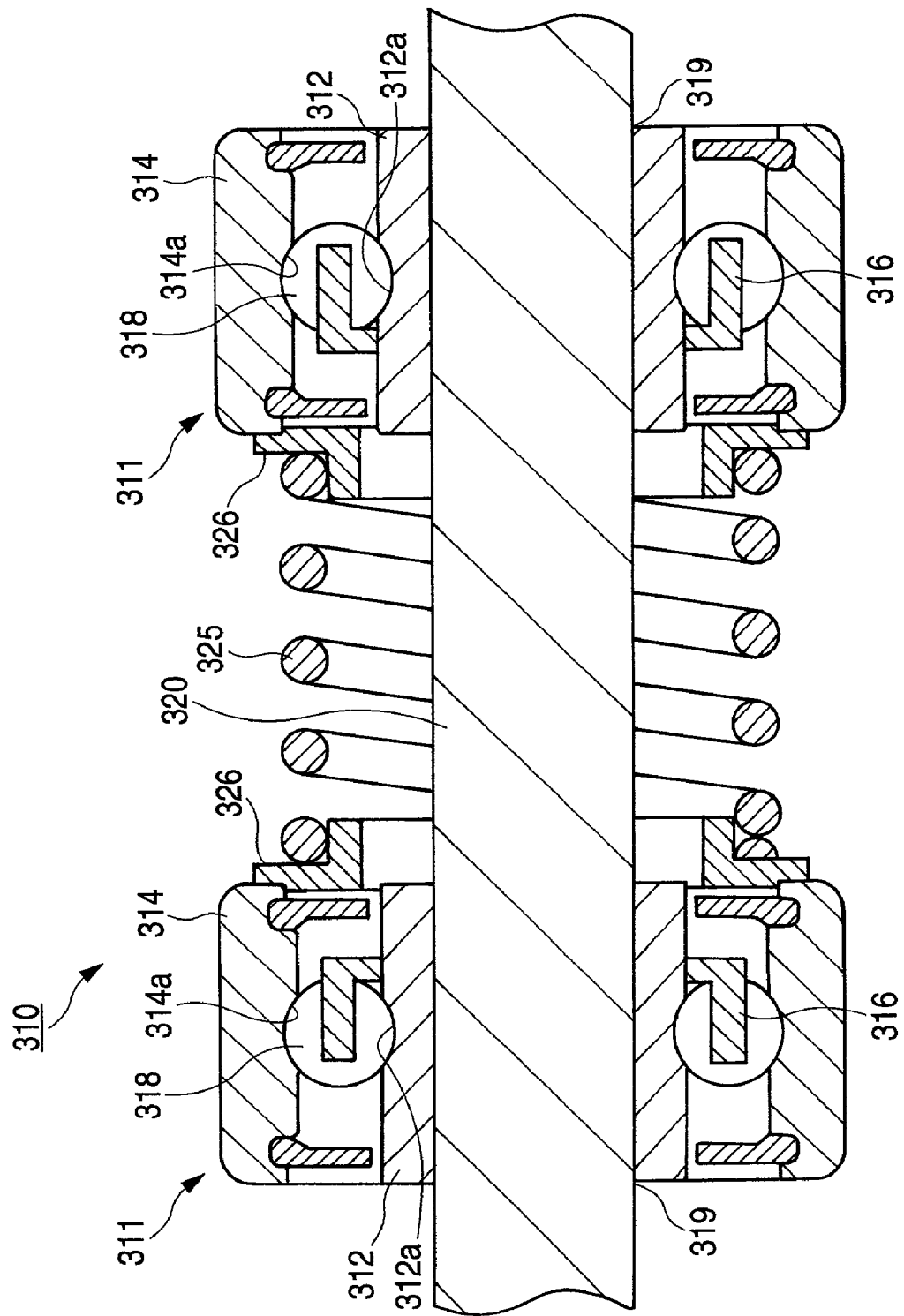
FIG. 16 is a cross sectional view showing a bearing unit according to a fourteenth embodiment of the present invention.

A rolling bearing unit 310 shown in FIG. 16 includes a cylindrical shaft 320 and a pair of bearings (single deep groove ball bearing) 311. Each of the rolling bearings 311 includes an inner ring 312 as a raceway member having an inner raceway 312a in an outer surface being a third peripheral surface, an outer ring 314, a retainer 316 inserted between the inner and outer rings 312 and 314, and a plurality of balls (rolling elements) 318. The balls 318 are rollable between an inner raceway 312a and an outer raceway 314a.

A coil spring 325 is placed between the pair of rolling bearings 311 through spring seats 326 intervening therebetween. The coil spring 325 applies a preload to the rolling bearings 311.

The inner ring 312 of the rolling bearing 311 has a predetermined inside diameter before it is assembled to the shaft 320 (when it is in free state). An outer diameter of the shaft 320 is slightly larger than the inner diameter of the inner ring 312 when it is in a free state. A difference (interference) between the outer diameter of the shaft 320 and the inner diameter of the inner ring 312 being in a free state is 4 $\mu$m or smaller. Even when the interference is 0 $\mu$m, a radial run-out of the shaft is not caused at the fitting part of the shaft 320 and the inner ring 312. Thus, if the interference is set at 4 $\mu$m or smaller, an appropriate interference fitting as will be described later is secured.

Before the rolling bearing 311 are fitted to the shaft 320, a fitting portion of the shaft 320 is coated with adhesive 319. An adhesive of the slow hardening type may be used for the adhesive 319. Then, the inner ring 312 of the rolling bearing 311 is press-fitted to the part of the shaft 320 coated with the adhesive 319, from the end of the shaft. As a result, a rolling bearing unit as shown in FIG. 16 is obtained.

In this state, the shaft 320 is rotated in a state that the outer ring 314 of the rolling bearing 311 is fixed and a radial run-out in a portion of the shaft 320 ranging from a location on the shaft on which the rolling bearing 311 is attached, toward an axial end of the shaft is measured. If the run-out is 2 $\mu$m or smaller, the structure is left as it is till the adhesive 319 is hardened. If the run-out exceeds 2 $\mu$m, the run-out is reduced in a manner as shown in FIG. 17.

Figure 17:
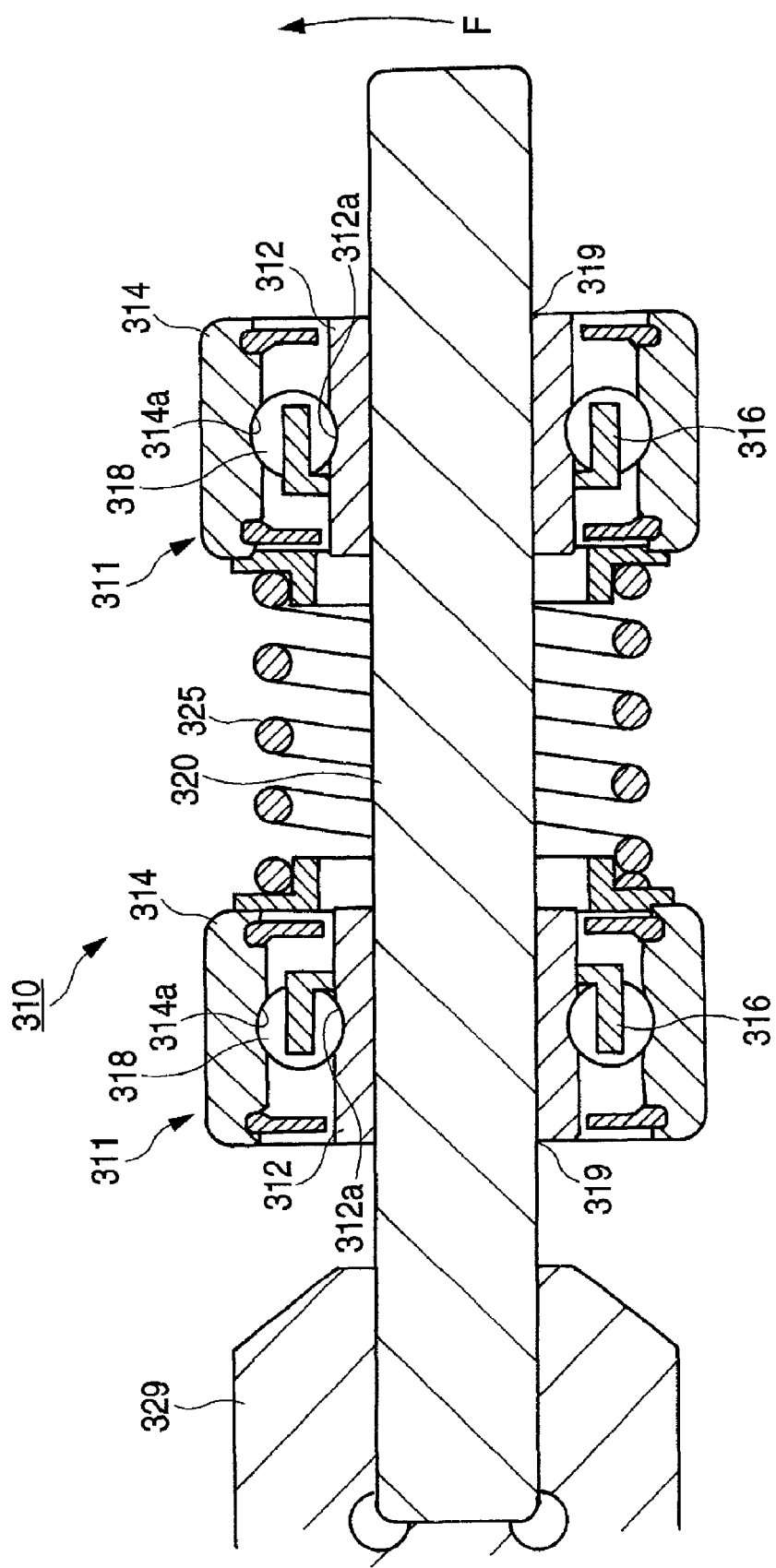
FIG. 17 is a cross sectional view useful in explaining a radial run-out of the shaft.

As shown in FIG. 17, one end (the left end in the figure) of the shaft 320 is fitted to a rotation tool 329. Then, as indicated by an arrow F in the figure, a bending moment is applied to the other end (the right end in the figure) of the shaft 320 while rotating the shaft 320. The magnitude of the bending moment is set at a large value at first, and then is gradually decreased with time.

In this way, residual stress in the fitting faces of the shaft 320 and the inner ring 312 is reduced.

In the rolling bearing unit 310 thus constructed, the interference is reduced and hence, the bending of the shaft 320 is also reduced by using the combination of the interference fitting and the bonding. Accordingly, the radial run-out of the shaft is reduced. Since the interference is small, the work to fit the inner rings 312 to the shaft 320 is easy performed. Further, since the run-out of the shaft which will occur is reduced, when the run-out of the shaft is measured, if the run-out is relatively large as the result of the measurement, the shaft is processed for reducing its run-out. Thereafter, since the inner ring 312 is fastened to the shaft 320 completely, the run-out of the shaft is considerably reduced in value. After the adhesive 319 is hardened and the shaft 320 is completely fastened to the inner ring 312, even if the bending moment acts on the shaft 320, there is no possibility that the run-out grows, to thereby rotate the shaft 320 with high precision.

Figure 18:
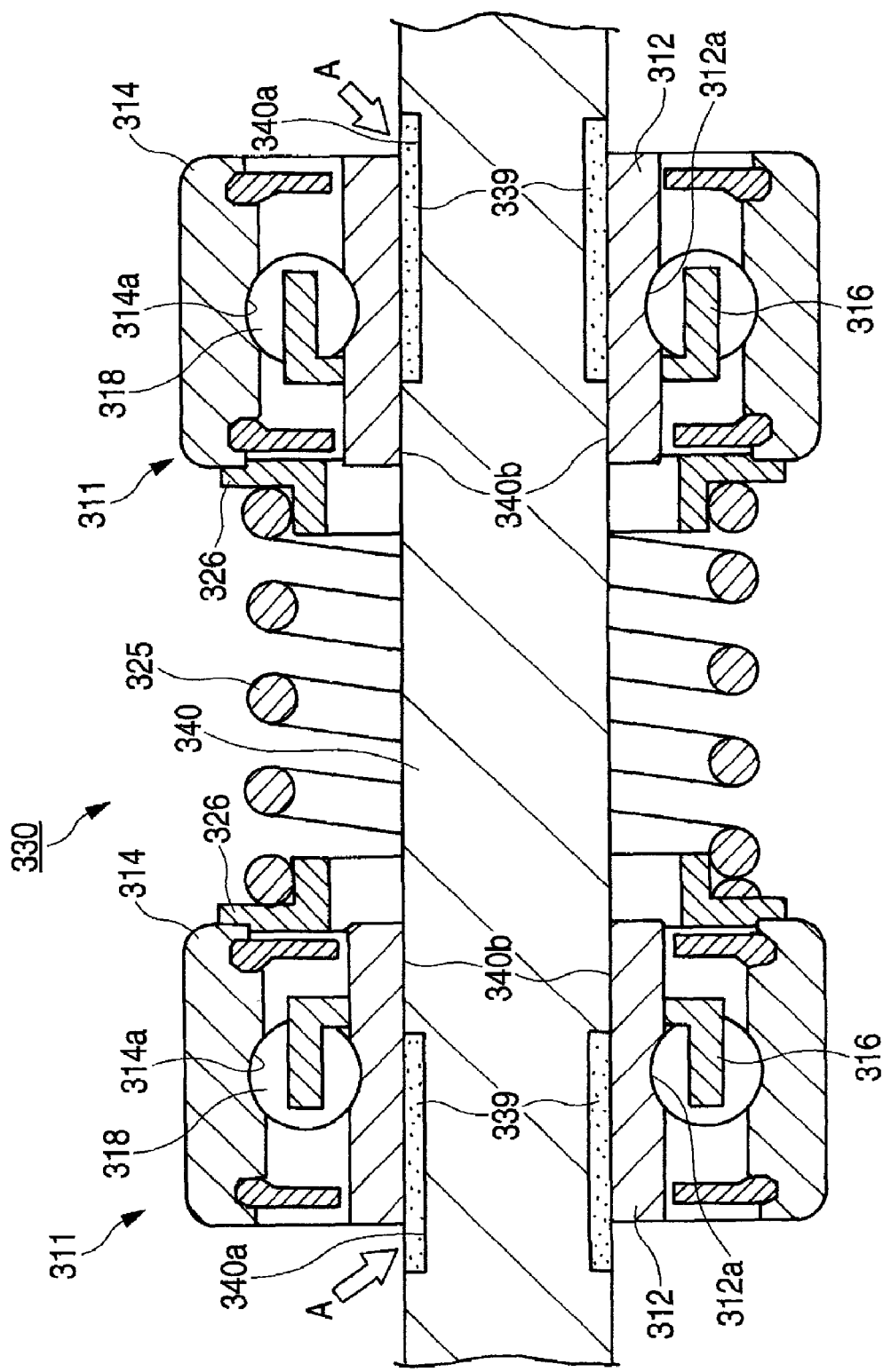
FIG. 18 is a cross sectional view showing a bearing unit according to a fifteenth embodiment of the present invention.

FIG. 18 shows a bearing unit according to a sixteenth embodiment of the present invention. A difference of a rolling bearing unit 330 of the this embodiment from that of the fifteenth embodiment, resides in the structure of a shaft 340. The remaining structure is substantially the same as of the fifteenth embodiment. Recessed parts 340a are formed in the shaft 340 at parts corresponding to the inner peripheral surfaces of the inner rings 312. One axial end of the shaft 340 extends outside in the axial direction beyond the corresponding end of the inner ring 312. In this embodiment, the recessed parts 340a is exposed to outside at the side opposite to the side including the coil spring 325 and a spring seat 326. The recessed parts 340a of the shaft 340 are formed around the entire circumference of the shaft 340. The outer peripheral surfaces of the parts of the shaft 340 at which the recessed parts 340a are formed, have cylindrical surfaces. Thus, the shaft 340 is a cylindrical member with stepped parts.

At the parts of the shaft 340, where the recessed parts 340a are formed, the fitting of the inner ring 312 to the shaft 340 is not the interference fitting, but at the parts of the shaft which correspond to the inner peripheral surface of the inner ring 312 but are out of the recessed parts 340a, the inner rings 312 are press fitted to the shaft 340. Thus, the shaft 340 includes fitting parts 340b to which the inner rings of the rolling bearings 311 are fitted, at the parts thereof to which the rolling bearings 311 are mounted.

In order to mount the rolling bearings 311 to the shaft 340, the inner ring 312 of each rolling bearing 311 is press fitted to the part of the shaft 340, which is not coated with the adhesive, until it reaches the fitting parts 340b of the shaft 340 from an end portion of the shaft 340. At this time, a range of the recessed part 340a ranging from the end of the inner ring 312 in the axial direction to the axial end of the recessed part 340a is exposed to outside.

In this state, the shaft 340 is rotated in a state that the outer rings 314 of the rolling bearings 311 are fixed. And a radial run-out of the shaft 340 is measured in a range from the rolling-bearing mounted position on the shaft to the axial end thereof. When the run-out exceeds 2 $\mu$m, the run-out is reduced in the manner as shown in FIG. 16.

After the run-out is reduced, adhesive 339 is injected into the exposed, recessed parts 340a of the shaft as in arrows A in FIG. 18.

In the rolling bearing unit 330 thus constructed, at the time of inspecting and correcting the run-out, the adhesive 339 is not applied to between the shaft 340 and the inner ring 312. Accordingly, the run-out may be easily inspected and corrected. Thereafter, a sufficient amount of adhesive 339 may be applied to between the shaft 340 and the inner ring 312, so that the rolling bearings 311 may firmly be fixed to the shaft 340.

The adhesive 339 may be injected to the recessed part on the side of the rolling bearing 311, which is opposite to the side including the coil spring 325 and the spring seat 326. Accordingly, the injection of the adhesive 339 maybe performed easily without any hindrance. The adhesive injection work may be automated, if necessary.

It should be understood that the invention is not limited to the above-mentioned embodiments, but may variously be modified within true spirits of the present invention.

Figure 19:
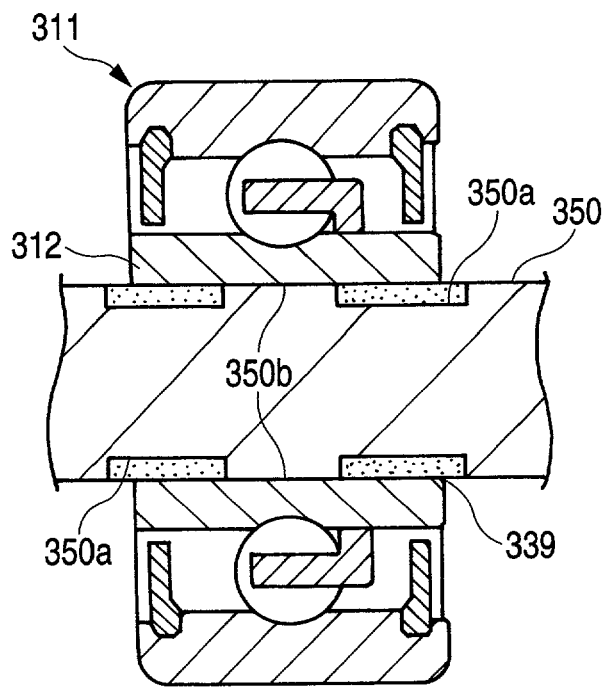
FIG. 19 is a view showing a modification of the fifteenth embodiment of the invention.

Recessed parts 350a may be formed around the entire circumference of the shaft on both sides of a fitting part 350b of a shaft 350, as shown in FIG. 19.

Figure 20:
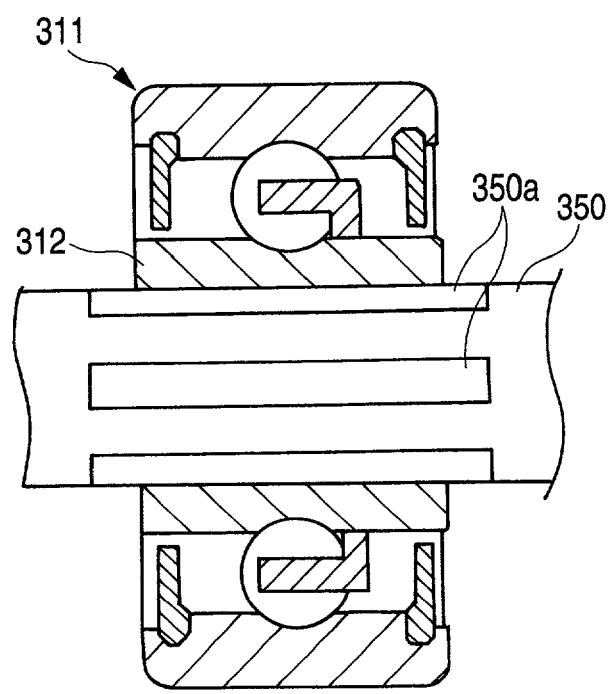
FIG. 20 is a view showing another modification of the fifteenth embodiment the invention.
Figure 21:
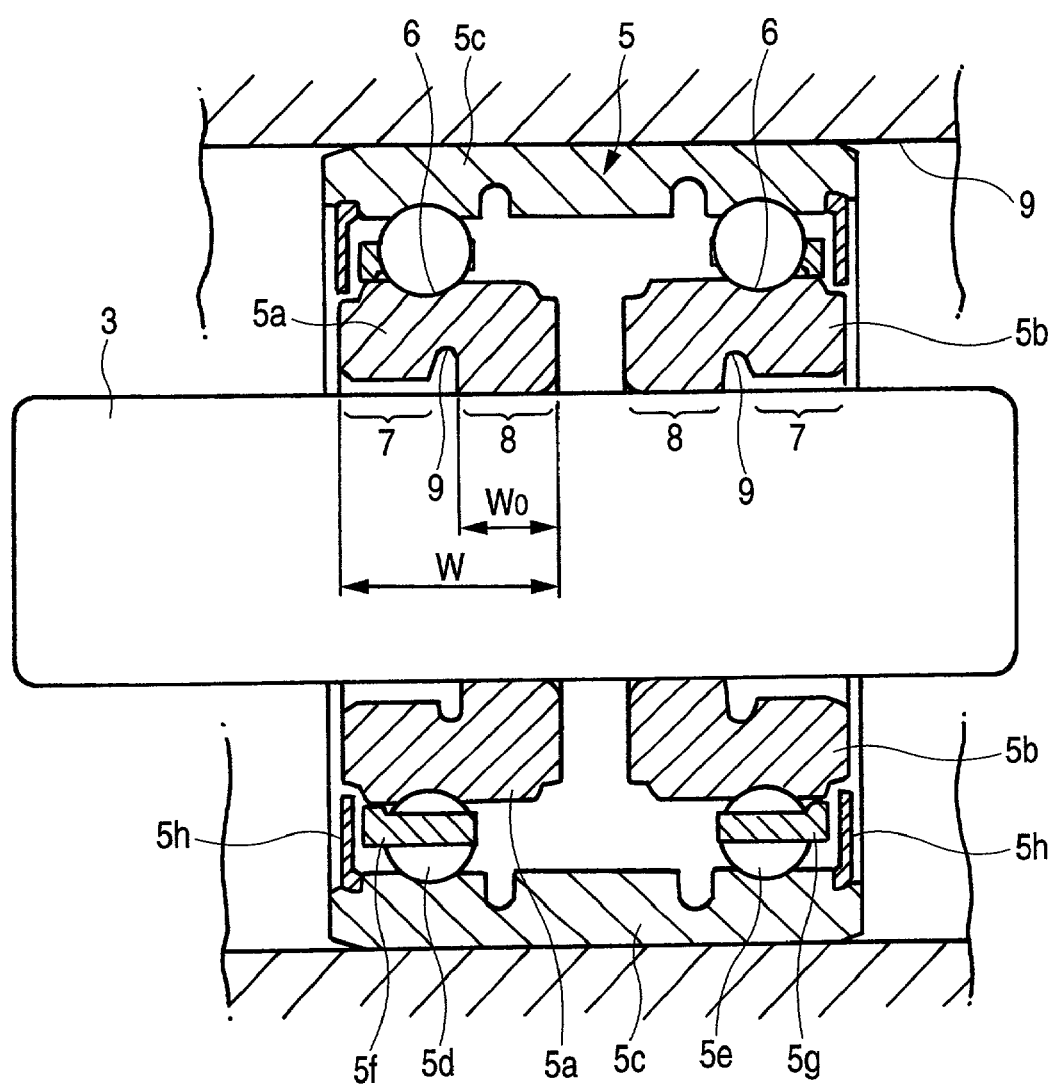
FIG. 21 is a longitudinal sectional view showing a conventional bearing unit.
Figure 22:
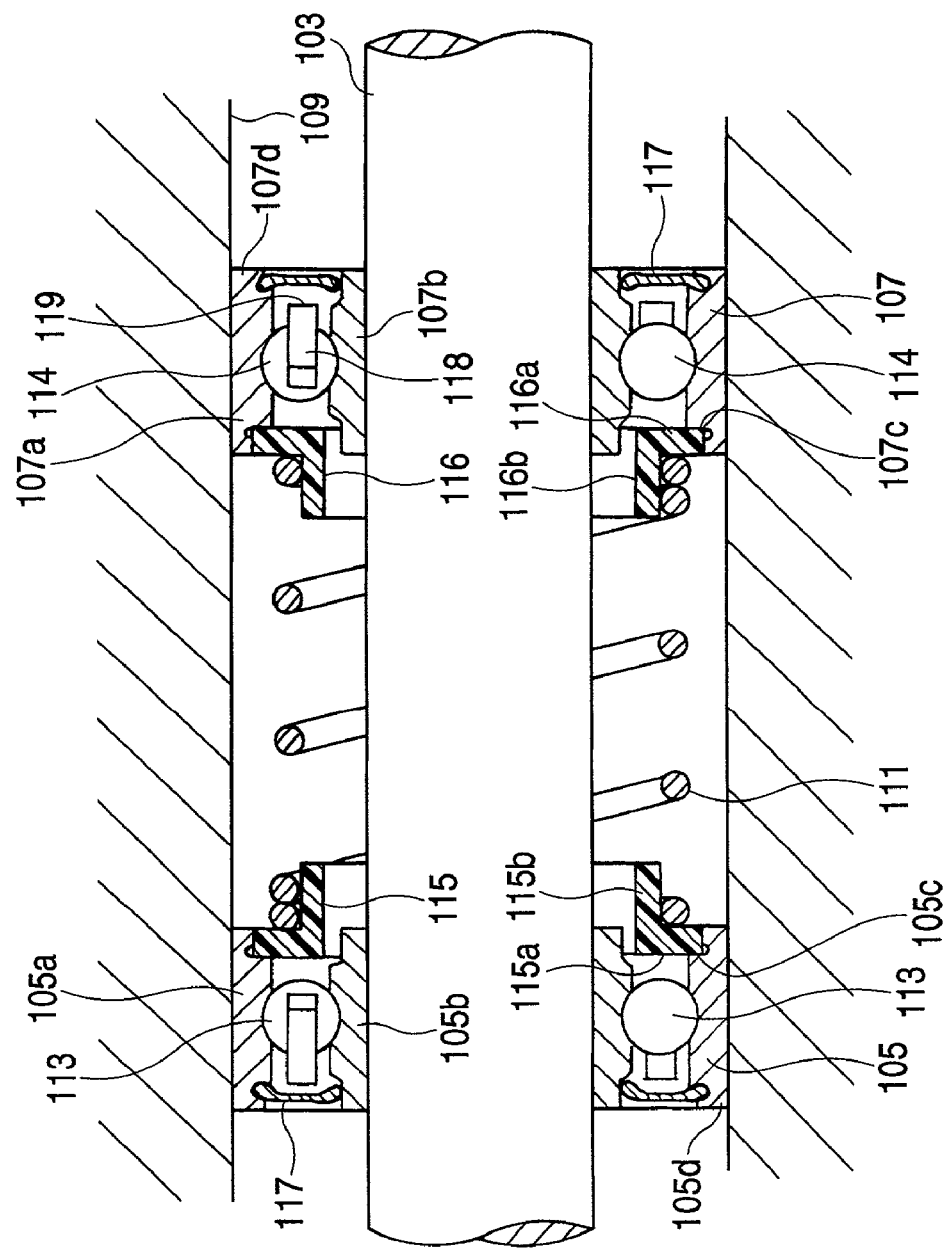
FIG. 22 is a longitudinal sectional view showing a conventional bearing unit.
Figure 23A:
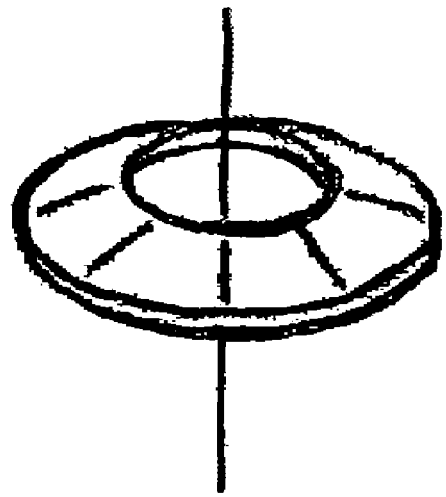
Figure 23B:
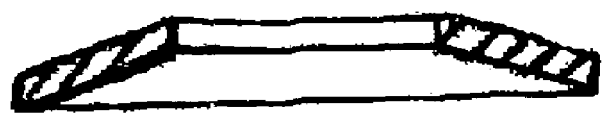

One or more number of grooves 360a, which axially extend, may be formed in the outer peripheral surface of the shaft 360 as shown in FIG. 20. Where the plurality of grooves 360a are used, those grooves are circumferentially arranged at angular spatial intervals.

While the inner rings are fitted to the shaft in the above-mentioned embodiments, the invention is operable in such a structure using a holding member to be fitted to the outer rings.

As seen from the foregoing description, the present invention succeeds in providing a rolling bearing unit which is free from the troublesome assembling work and the shaft bending at the interference on the shaft, and is small in the run-out.

What is claimed is:

1. A bearing unit comprising:
   a housing;
   a shaft passing through said housing and rotatably supported on said housing, said shaft defining an axial direction thereof; and
   a pair of rolling bearings disposed between said housing and said shaft and fitted to two positions on said shaft, which are spaced apart from each other in the axial direction, at least one of said rolling bearings having an inner ring press-fitted to said shaft, said inner ring defining an intermediate portion in the axial direction at least partially including an inner raceway surface,
   wherein a reduced diameter part having an outer diameter smaller than the inner diameter of said inner ring and a predetermined width in the axial direction is formed on said shaft at a position corresponding to said intermediate portion of said inner ring so that inner circumferential surfaces located at both ends of said inner ring in the axial direction are interference fitted to said shaft and the inner circumferential surface at said intermediate portion thereof is clearance fitted to said shaft,
   wherein the predetermined width of the reduced diameter part is longer than an entire width of the raceway surface of one of the inner rings.
   wherein each of said pair of rolling bearings is a ball bearing including a plurality of balls and an outer ring, and
   further wherein a center position of said reduced diameter part of said shaft in the axial direction is substantially set at an intersection position of said inner raceway surface with a contact angle line connecting points that said ball contacts with said inner and outer rings.

2. The bearing unit according to claim 1, wherein said predetermined width of said reduced diameter part is set to be larger than an axial width of said inner raceway surface.

3. A bearing unit comprising:
   a housing;
   a shaft passing through said housing and rotatably supported on said housing, said shaft defining an axial direction thereof;
   a pair of rolling bearings disposed between said housing and said shaft and fitted to two positions on said shaft, which are spaced apart from each other in the axial direction;
   a compression spring disposed between said outer rings of said pair of rolling bearings while being wound around said shaft, for applying a preload to said outer rings in such a direction as to move away from each other;
   sealing plates located at both ends of said respective outer rings of said pair of rolling bearings, for preventing a lubricant filled between said outer ring and said inner ring from leaking therefrom; and
   spring seats for positioning ends of said compression spring, said spring seats including stepped parts axially formed on said sealing plates, which are located at inner ends of said outer rings opposed to each other.

4. A bearing unit comprising:
   a housing;
   a shaft passing through said housing and rotatably supported on said housing, said shaft defining an axial direction thereof;
   a pair of rolling bearings disposed between said housing and said shaft and fitted to two positions on said shaft, which are spaced apart from each other in the axial direction;
   a compression spring disposed between said outer rings of said pair of rolling bearings while being wound around said shaft, for applying a preload to said outer rings in such a direction as to move away from each other;
   sealing plates located at both ends of said respective outer rings of said pair of rolling bearings, for preventing a lubricant filled between said outer ring and said inner ring from leaking therefrom; and
   spring seats for positioning ends of said compression spring, said spring seats including stepped parts axially formed in inner ends of said outer rings opposed to each other for retaining said sealing plates.

5. A bearing unit comprising:
   a shaft defining an axial direction thereof;
   a pair of rolling bearings fitted to two positions on said shaft, which are spaced apart from each other in the axial direction, said rolling bearing including a retainer for guiding rolling elements;
   a compression spring disposed between said outer rings of said pair of rolling bearings while being wound around said shaft, for applying a preload to said outer rings in such a direction as to move away from each other; and
   spring seats attached to said pair of rolling bearings, for positioning ends of the compression spring, said spring seats serving as sealing plates for preventing a lubricant filled between said outer ring and said inner ring from leaking therefrom,
   wherein an inner side of said spring seat defines a retainer-interference avoiding clearance for avoiding an interference with the back side of said retainer.

6. The bearing unit according to claim 5, wherein said spring seat extends inwardly in the radial direction so that at least one labyrinth is provided between the inner surface of said spring seat and at least one of an end surface of the inner ring and said shaft.

7. The bearing unit according to claim 5, wherein said spring seat is made of a plastic material.

8. The bearing unit according to claim 5, wherein said spring is a coned disk spring.

9. The bearing unit according to claim 5, wherein said bearings are fastened to said shaft by press-fitting and adhesion.

10. A rolling bearing unit comprising:
    a holding member having a first cylindrical peripheral surface, said holding member defining an axial direction and a radial direction thereof; and
    a plurality of ring members each having second and third cylindrical peripheral surfaces, which are coaxially aligned with each other, said third cylindrical peripheral surfaces having a raceway surface, said plurality of ring members being fitted to said holding member with a predetermined interval in the axial direction such that said second periphery surface of said ring member is interference fitted to said first periphery surface of said holding member, wherein the interference between said first and second periphery surfaces is set to be 4 $\mu$m or smaller, a run-out of said holding member in the radial direction when said holding member is rotated is set to be 2 $\mu$m or less, and said ring members are fastened to said holding member by the combination of the interference fitting and adhesion.

11. A rolling bearing unit comprising:

a shaft having a cylindrical outer peripheral surface, said shaft defining an axial direction and a radial direction thereof; and a plurality of rolling bearings held on said shaft with a predetermined interval in the axial direction such that inner rings of said rolling bearings are interference fitted to the outer peripheral surface of said shaft, and said rolling bearings being subjected to a preload, wherein a recessed portion is formed in an outer peripheral surface of the shaft, has an outer diameter that is smaller than the inner diameter of one of said inner rings, and has a predetermined width in the axial direction, further wherein said predetermined width is larger than an entire width of a raceway surface of one of said inner rings, and wherein the interference between said shaft and said inner ring is set to be 4 $\mu$m or smaller, a run-out of said shaft in the radial direction when said shaft is rotated is selected to be 2 $\mu$m or less, and said inner rings are fastened to said shaft by the combination of the interference fitting and adhesion.

12. The rolling bearing unit according to claim 11, wherein a recessed portion is formed in the outer peripheral surface of said shaft at a position facing the inner peripheral surface of said inner ring, and an adhesive is applied to said recessed portion.

13. The rolling bearing unit according to claim 12, wherein said recessed portion is formed around the entire circumference of said shaft, and the outer peripheral surface of said shaft at which said recessed portion is formed in a cylindrical surface.

14. A rolling bearing unit comprising:

a shaft having a cylindrical outer peripheral surface, said shaft defining an axial direction and a radial direction thereof; and a plurality of rolling bearings held on said shaft with a predetermined interval in the axial direction such that inner rings of said rolling bearings are interference fitted to the outer peripheral surface of said shaft, and said rolling bearings being subjected to a preload, wherein the interference between said shaft and said inner ring is set to be 4 $\mu$m or smaller, a run-out of said shaft in the radial direction when said shaft is rotated is selected to be 2 $\mu$m or less, and said inner rings are fastened to said shaft by the combination of the interference fitting and adhesion, wherein a recessed portion is formed in the outer peripheral surface of said shaft at a position facing the inner peripheral surface of said inner ring, and an adhesive is applied to said recessed portion, and wherein at least one of the ends of said recessed portion extends outside from the end of said inner ring in the axial direction and is exposed to outside.

* * * * *